(12) United States Patent
Nakama

(10) Patent No.: US 12,192,419 B2
(45) Date of Patent: *Jan. 7, 2025

(54) IMAGE FORMING APPARATUS HAVING MEDIA TYPE SENSOR

(71) Applicant: CANON KABUSHIKI KAISHA, Tokyo (JP)

(72) Inventor: Katsuya Nakama, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/516,534

(22) Filed: Nov. 21, 2023

(65) Prior Publication Data

US 2024/0089383 A1 Mar. 14, 2024

Related U.S. Application Data

(63) Continuation of application No. 17/719,638, filed on Apr. 13, 2022, now Pat. No. 11,843,735.

(30) Foreign Application Priority Data

Apr. 14, 2021 (JP) .................................. 2021-068517

(51) Int. Cl.
*H04N 1/00* (2006.01)
(52) U.S. Cl.
CPC ..... *H04N 1/00482* (2013.01); *H04N 1/00724* (2013.01); *H04N 1/00766* (2013.01)
(58) Field of Classification Search
None
See application file for complete search history.

(56) References Cited

U.S. PATENT DOCUMENTS

| 7,711,302 | B2 | 5/2010 | Ueda |
| 10,412,258 | B2 | 9/2019 | Shibuya et al. |
| 2013/0194622 | A1 | 8/2013 | Low et al. |
| 2014/0313529 | A1 | 10/2014 | Nakashio |
| 2020/0285177 | A1 | 9/2020 | Yamada |
| 2020/0382659 | A1 | 12/2020 | Unno |

FOREIGN PATENT DOCUMENTS

| JP | 11-24512 A | 1/1999 |
| JP | 2005-070877 A | 3/2005 |
| JP | 2008-185698 A | 8/2008 |
| JP | 2009-047724 A | 5/2009 |
| JP | 2012-113211 A | 6/2012 |
| JP | 2013-086330 A | 5/2013 |
| JP | 2016-072693 A | 5/2016 |
| JP | 2017-138520 A | 8/2017 |
| JP | 2018-069452 A | 5/2018 |

*Primary Examiner* — Lennin R RodriguezGonzalez
(74) *Attorney, Agent, or Firm* — Venable LLP

(57) ABSTRACT

An image forming apparatus includes: an image forming unit configured to form an image on each of media; a plurality of sheet feeding cassettes each configured to store the media; a media sensor which is provided on a conveyance path through which the media are fed from any of the plurality of sheet feeding cassettes to the image forming unit, and is configured to detect a type of the conveyed media; a memory configured to store, for each sheet feeding cassette, the type of media stored in each of the plurality of sheet feeding cassettes; and a controller configured to output, to a display, a selection screen for selecting a sheet feeding cassette in which media to be used in calibration of adjusting a density of the image to be formed by the image forming unit are stored.

7 Claims, 17 Drawing Sheets

| | SIZE | MEDIA CHARACTERISTIC | MEDIA SENSOR DETECTION RESULT |
|---|---|---|---|
| FIRST SHEET FEEDING CASSETTE | A4 | AUTOMATIC | PLAIN PAPER |
| SECOND SHEET FEEDING CASSETTE | A4 | AUTOMATIC | THICK PAPER |
| THIRD SHEET FEEDING CASSETTE | A3 | PLAIN PAPER | — |
| FOURTH SHEET FEEDING CASSETTE | A4 | AUTOMATIC | UNKNOWN |

FIG. 8

IMAGE FORMING APPARATUS HAVING MEDIA TYPE SENSOR

BACKGROUND OF THE INVENTION

Field of the Invention

The present disclosure relates to an image forming apparatus employing an electrophotographic system, an electrostatic recording system, or the like so as to form an image on each of media, with examples of the apparatus being such as a copying machine, a multifunction peripheral, or a printer.

Description of the Related Art

FIG. 5A to FIG. 5C and FIG. 6 are exemplary views of the selection screen for selecting the sheet feeding cassette in which the media to be used in the tone correction have been stored. FIG. 5A shows an example of a media selection screen. Through the media selection screen, the media characteristic (type of media) to be used in the image formation is selected. In the media selection screen of FIG. 5A, any of a selection button 501 for "plain paper," a selection button 502 for "thick paper," or a selection button 503 for "coated paper" can be selected. When any of the selection button 501, 502, or 503 is selected and an "OK" button 504 is pressed, in the related art, a sheet feeding cassette selection screen exemplified in FIG. 5B or FIG. 5C is displayed. A description is given here of a case in which the "plain paper" is selected.

In the first embodiment, when the type of media is selected in the media selection screen of FIG. 5A, the sheet feeding cassette selection screen exemplified in FIG. 6 is displayed. A description is given here of a case in which the "plain paper" is selected from the media selection screen. Similarly to FIG. 5C, the sheet feeding cassette selection screen of FIG. 6 displays that the type of media required for the tone correction is the plain paper, and also displays the size of media stored in each of the sheet feeding cassettes 220 to 223. The media characteristic (types of media) of the media stored in the sheet feeding cassette 222 is displayed as "PLAIN PAPER". Further, the media characteristics (types of media) of the media stored in the respective sheet feeding cassettes 220, 221, 223 are all displayed as "automatic.". However, grayed-out and non-selectable "sheet feeding cassette" buttons 514 and 516 and selectable "sheet feeding cassette" buttons 513 and 515 are present.

In general, the media characteristic is set by a user through use of, for example, an operation unit provided to the image forming apparatus or a personal computer connected to the image forming apparatus. The user stores media into a sheet feeding cassette and sets the media characteristic of the media. For example, when the user stores "plain paper" into the sheet feeding cassette, the user sets the media characteristic of the plain paper, and when the user stores "thick paper" into the sheet feeding cassette, the user sets the media characteristic of the thick paper. In recent years, there has been provided an image forming apparatus having a media sensor mounted thereon. The media sensor detects the media characteristic. The image forming apparatus having the media sensor mounted thereon determines the media characteristic in accordance with a detection result obtained by the media sensor, and performs print processing in an optimum image forming condition corresponding to the media characteristic. In this case, the user sets, through the operation unit, "automatic" being an operation mode for determining the media characteristic based on the detection result obtained by the media sensor (Japanese Patent Application Laid-open No. 2005-070877). The user frequently uses the setting of "automatic" because of the easiness of the setting allowing operation without being conscious of the media characteristic. In the image forming apparatus having the media sensor mounted thereon, the user is not required to set the media characteristic, and thus the convenience is improved.

In an image forming apparatus including a plurality of sheet feeding cassettes, when the adjustment of the image forming condition such as the tone correction is to be performed, a type of media to be used in the adjustment is selected. In an image forming apparatus not having the media sensor mounted thereon, when the type of media to be used in the adjustment is selected, the sheet feeding cassette in which the media of the selected type have been stored becomes selectable. In this case, the sheet feeding cassette in which media of a different type have been stored is not selectable. The user selects, from the selectable sheet feeding cassettes, one sheet feeding cassette in which the media to be used in the adjustment have been stored. In the image forming apparatus having the media sensor mounted thereon, when the type of media to be used in the adjustment is selected, the sheet feeding cassette in which the media of the selected type have been stored becomes selectable, but other sheet feeding cassettes are also selectable. Accordingly, the user may select a sheet feeding cassette in which media inappropriate for the adjustment have been stored. When the adjustment is performed through use of the media inappropriate for the adjustment, the adjustment is incorrectly performed, and quality of a printed product is reduced. In view of the above, the present disclosure provides an image forming apparatus with which a user can select a sheet feeding cassette in which media appropriate for predetermined processing such as adjustment of an image forming condition are stored.

SUMMARY OF THE INVENTION

An image forming apparatus according to the present disclosure includes: an image forming unit configured to form an image on each of media; a plurality of sheet feeding cassettes each configured to store the media; a media sensor which is provided on a conveyance path through which the media are fed from any of the plurality of sheet feeding cassettes to the image forming unit, and is configured to detect a type of the conveyed media; a memory configured to store, for each sheet feeding cassette, the type of media stored in each of the plurality of sheet feeding cassettes; and a controller configured to output, to a display, a selection screen for selecting a sheet feeding cassette in which media to be used in calibration of adjusting a density of the image to be formed by the image forming unit are stored, based on the type of media of each sheet feeding cassette stored in the memory.

Further features of the present invention will become apparent from the following description of exemplary embodiments (with reference to the attached drawings).

BRIEF DESCRIPTION OF THE DRAWINGS

FIG. 8 is an exemplary table of media information.

DESCRIPTION OF THE EMBODIMENTS

Now, embodiments of the present disclosure are described with reference to the accompanying drawings.

First Embodiment

Figure 1:
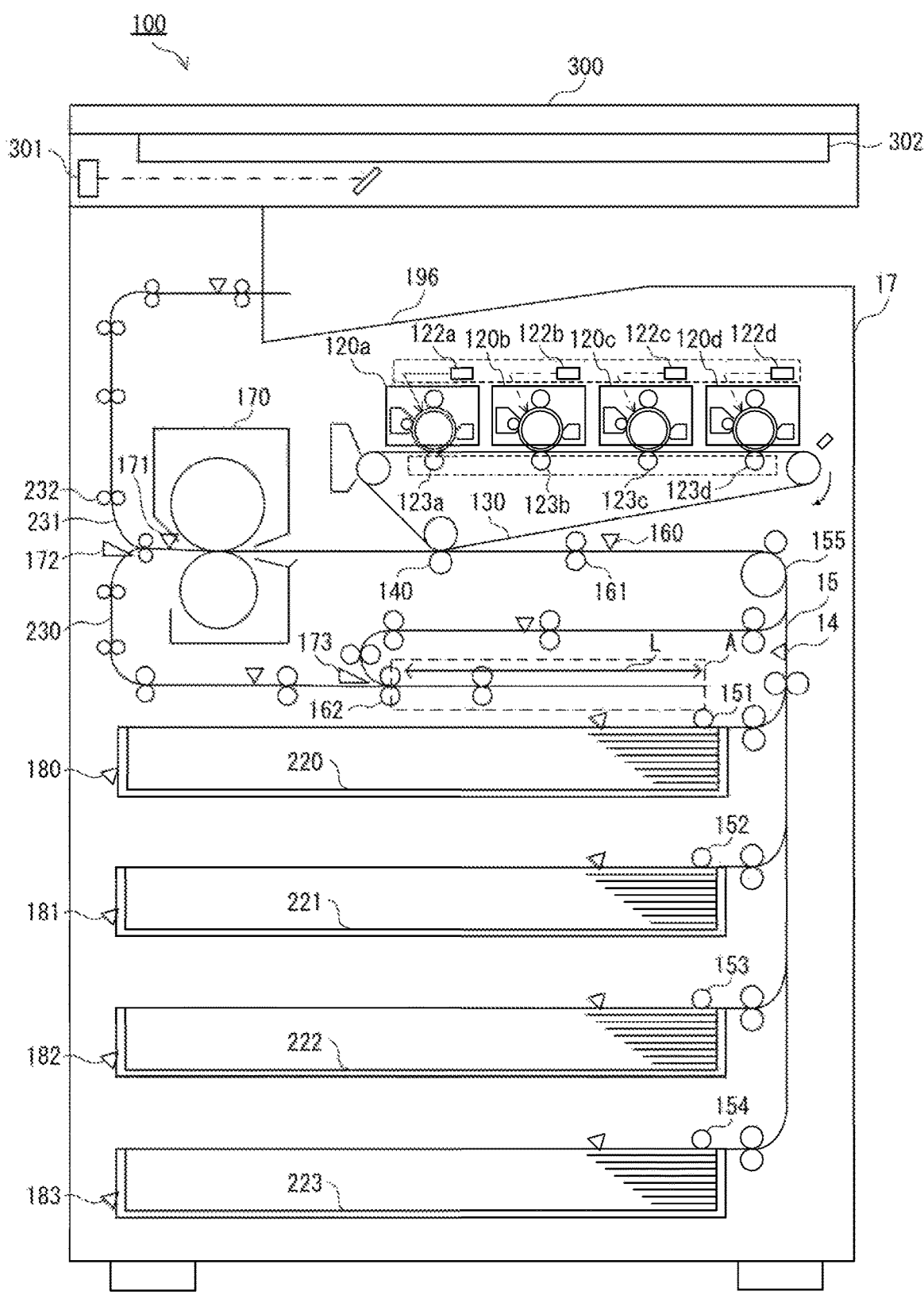
FIG. 1 is a configuration view of an image forming apparatus.
Figure 2:
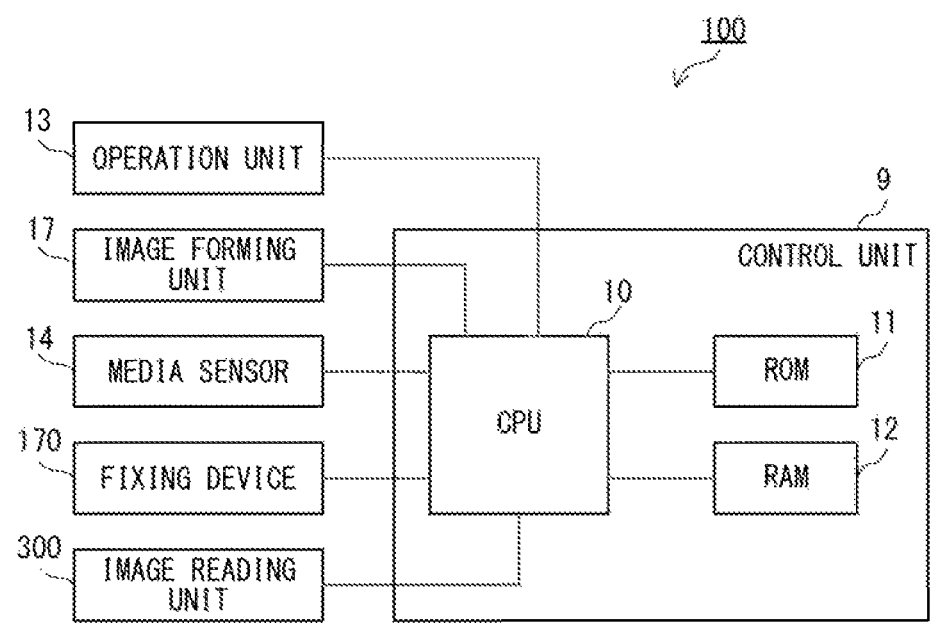
FIG. 2 is an explanatory diagram of a control unit.

FIG. 1 is a configuration view of an image forming apparatus 100 according to a first embodiment of the present disclosure. FIG. 2 is an explanatory diagram of a control unit 9 for controlling an operation of the image forming apparatus 100. The control unit 9 is incorporated in the image forming apparatus 100. The control unit 9 is an information processing device including a central processing unit (CPU) 10, a read only memory (ROM) 11, and a random access memory (RAM) 12. The CPU 10 executes a computer program stored in the ROM 11 so as to control the operation of the image forming apparatus 100. The RAM 12 provides a work area when the CPU 10 executes the computer program. The control unit 9 is connected to an operation unit 13, a media sensor 14, an image forming unit 17, a fixing device 170, and an image reading unit 300.

The operation unit 13 is a user interface including an input interface. The input interface corresponds to key buttons for receiving user instruction information as input, or a touch panel for receiving the user instruction information as input. Further, the operation unit 13 may include an output interface in addition to the input interface. The output interface corresponds to a display, a speaker, or the like. The CPU 10 receives, from the operation unit 13, for example, instructions on various settings and an operation start. The operation unit 13 is controlled by the CPU 10 so as to perform display of various screens such as a setting screen and an instruction screen on the display.

The image reading unit 300 includes a platen glass 302 and an image sensor 301. On the platen glass 302, an original to be read is placed with its surface to be read facing the platen glass 302 side. The image reading unit 300 is controlled by the CPU 10 so as to irradiate the original placed on the platen glass 302 with light to receive the reflected light by the image sensor 301. The image sensor 301 generates image data indicating an image of the original based on the received reflected light. The image sensor 301 transmits the generated image data to the CPU 10.

The image forming unit 17 includes image forming portions 120a, 120b, 120c, and 120d, laser scanners 122a, 122b, 122c, and 122d, an intermediate transfer belt 130, primary transfer portions 123a, 123b, 123c, and 123d, a secondary transfer portion 140, and the like. The image forming unit 17 is controlled by the CPU 10 so as to form an image on a medium. The fixing device 170 is controlled by the CPU 10 so as to fix the image to the medium.

The media on each of which the image is to be printed are stored in a plurality of sheet feeding cassettes 220, 221, 222, and 223. Types of the media to be stored in the respective sheet feeding cassettes 220, 221, 222, and 223 may be the same or may be different from each other. On the sheet feeding cassettes 220, 221, 222, and 223, sheet feeding cassette opening/closing sensors 180, 181, 182, and 183 for monitoring the opening or closing are provided, respectively.

The CPU 10 performs control of a drive source (not shown) for driving, for example, a conveyance roller to rotate in order to feed the media from the sheet feeding cassettes 220, 221, 222, and 223. The CPU 10 monitors the opening or closing of the sheet feeding cassettes 220, 221, 222, and 223 based on detection results obtained by the sheet feeding cassette opening/closing sensors 180, 181, 182, and 183. The media sensor 14 is provided on a conveyance path 15 through which the media are fed. The CPU 10 detects a media characteristic such as a basis weight or a thickness of the conveyed medium based on a detection result obtained by the media sensor 14. The media characteristic can also be said as a physical quantity of the media. The CPU 10 stores the detected media characteristic into the RAM 12.

A basic image forming operation of the image forming apparatus 100 is described. The image forming apparatus 100 according to the first embodiment includes four sheet feeding cassettes 220, 221, 222, and 223. A description is given here of a case in which the media are fed from the sheet feeding cassette 220.

The CPU 10 which has received a print start instruction from the operation unit 13 starts a feeding operation of feeding media from the sheet feeding cassette 220. The sheet feeding cassettes 220, 221, 222, and 223 include pick-up rollers 151, 152, 153, and 154, respectively. The pick-up rollers 151, 152, 153, and 154 feed the media stored in the sheet feeding cassettes 220, 221, 222, and 223 to the conveyance path. On the conveyance path extending from the sheet feeding cassettes 220, 221, 222, and 223 to the secondary transfer portion 140, there are arranged the media sensor 14, conveyance rollers 155, a pre-registration conveyance sensor 160, and pre-registration conveyance rollers 161 in the stated order from the upstream of a conveying direction of the media.

The CPU 10 drives a motor serving as a drive source in response to the start of the feeding operation so as to rotate the pick-up roller 151, to thereby feed the media one by one from the sheet feeding cassette 220 to the conveyance path.

When the fed medium passes through a detection position of the media sensor 14, an output value corresponding to the media characteristic (physical quantity) is output. The CPU 10 detects the type of media based on the output value (detection result) obtained by the media sensor 14, and performs image formation in an image forming condition which is based on the detected type of media. For example, the CPU 10 controls an image forming speed or controls a target temperature of the fixing device 170 based on the type of media.

The image forming speed is a speed determined in advance in accordance with the type of media. The image formation and the media conveyance are performed at a speed corresponding to the image forming speed. The image forming speed is set to, for example, 300 mm/sec when the media are plain paper or thin paper, and is set to, for example, 150 mm/sec when the media are thick paper. The target temperature of the fixing device 170 is set in accordance with the type of media. The target temperature of the fixing device 170 is set to be relatively lower in the case of the thin paper as compared to the target temperature for the plain paper, and is set to be relatively higher in the case of the thick paper as compared to the target temperature for the plain paper.

The image forming portions 120a, 120b, 120c, and 120d start the image forming operation so as to meet the timing at which the medium reaches the secondary transfer portion 140. The image forming portion 120a forms a yellow image. The image forming portion 120b forms a magenta image. The image forming portion 120c forms a cyan image. The image forming portion 120d forms a black image. The image forming portions 120a, 120b, 120c, and 120d are cartridge devices which can be mounted to and removed from a main body of the image forming apparatus 100 by the user.

The image forming portions 120a, 120b, 120c, and 120d have the same configuration. Each of the image forming portions 120a, 120b, 120c, and 120d includes a photosensitive member, a charging roller, and a developing device. The photosensitive members are uniformly charged by the charging rollers, and then electrostatic latent images are formed on the photosensitive members by laser light radiated from the laser scanners 122a, 122b, 122c, and 122d, respectively. The developing devices develop the electrostatic latent images by toner (developer). In this manner, toner images are formed on the photosensitive members, respectively. The toner images formed in the image forming portions 120a, 120b, 120c, and 120d are transferred onto the intermediate transfer belt 130 through application of a primary transfer voltage to the primary transfer portions 123a, 123b, 123c, and 123d. The intermediate transfer belt 130 is rotated, and the toner images are transferred from the photosensitive members of the respective image forming portions 120a, 120b, 120c, and 120d at timings corresponding to a rotation speed. Accordingly, the toner images of the respective colors are transferred in a superimposed manner onto the intermediate transfer belt 130 so that the intermediate transfer belt 130 bears a full-color toner image. The intermediate transfer belt 130 is rotated so that the borne toner image is conveyed to the secondary transfer portion 140.

The CPU 10 causes the conveyance rollers 155 to convey the medium fed from the sheet feeding cassette 220 to the secondary transfer portion 140. At this time, the CPU 10 detects a position of the medium based on the detection result obtained by the pre-registration conveyance sensor 160. The CPU 10 controls the conveyance of the medium so that, based on the detected position of the medium and the position of the toner image on the intermediate transfer belt 130, a leading edge of the medium and a leading edge of the toner image match each other at the secondary transfer portion 140. For example, when the medium is detected by the pre-registration conveyance sensor 160 at a timing at which the medium reaches the secondary transfer portion 140 earlier than the toner image, the CPU 10 stops the medium for a predetermined time period at the pre-registration conveyance rollers 161. The CPU 10 restarts the conveyance of the medium by the pre-registration conveyance rollers 161 after the predetermined time period has elapsed, and controls a transfer position of the toner image onto the medium.

The secondary transfer portion 140 is applied with a secondary transfer voltage so that the toner image is transferred from the intermediate transfer belt 130 onto the medium. The medium having the toner image transferred thereon is conveyed to the fixing device 170. The fixing device 170 applies heat and pressure to the toner image so that the toner image is fixed to the medium. The CPU 10 conveys the medium having the image fixed thereto by the fixing device 170 to the downstream. A sheet conveyance sensor 171 is arranged on the downstream side of the fixing device 170. On the downstream side of the sheet conveyance sensor 171, the conveyance path is divided into a conveyance path 230 and a conveyance path 231. Thus, a flapper 172 is provided. The user gives in advance, from the operation unit 13, an instruction on to which of the conveyance path 230 or the conveyance path 231 the medium is conveyed.

When the CPU 10 detects that the medium has reached the detection position of the sheet conveyance sensor 171 based on the detection result obtained by the sheet conveyance sensor 171, the CPU 10 determines to which of the conveyance path 230 or the conveyance path 231 the medium is conveyed. The CPU 10 operates the flapper 172 based on the determination result, and conveys the medium to any of the conveyance path 230 or the conveyance path 231. For example, when an instruction on duplex printing is given through the operation unit 13, the CPU 10 conveys the medium to the conveyance path 230 when printing on a first surface of the medium is ended. When printing on both surfaces of the medium is ended in the duplex printing, or when an instruction on simplex printing is given, the CPU 10 conveys the medium to the conveyance path 231.

The medium conveyed to the conveyance path 231 is conveyed to further downstream by conveyance rollers 232 of the conveyance path 231, and is discharged as a printed product onto a sheet discharge tray 196. The conveyance path 230 includes reversing conveyance rollers 162, a flapper 173, and a reversing portion A. The medium conveyed to the conveyance path 230 is conveyed to the reversing portion A by the reversing conveyance rollers 162. When the medium is drawn into the reversing portion A, the flapper 173 is switched. Further, the reversing conveyance rollers 162 are rotated backward so that the medium is switched back. In this manner, the medium is conveyed toward the secondary transfer portion 140. In this case, the surface of the medium is inverted so that image formation is allowed to a second surface different from the first surface. After that, an image is formed on the second surface of the medium similarly to the first surface, and the medium is discharged as a printed product onto the sheet discharge tray 196. A length of the medium in the conveying direction is required to be shorter than a length L of the reversing portion A.

The CPU 10 monitors the detection result obtained by the sheet feeding cassette opening/closing sensor 180 so as to detect the opening or closing of the sheet feeding cassette 220. In this manner, the CPU 10 can also perform control so as to prevent the media feeding operation from being started when the sheet feeding cassette 220 is open. The same holds true also when the media are fed from the sheet feeding cassette 221, 222, or 223.

<Fixing Device>

Figure 3:
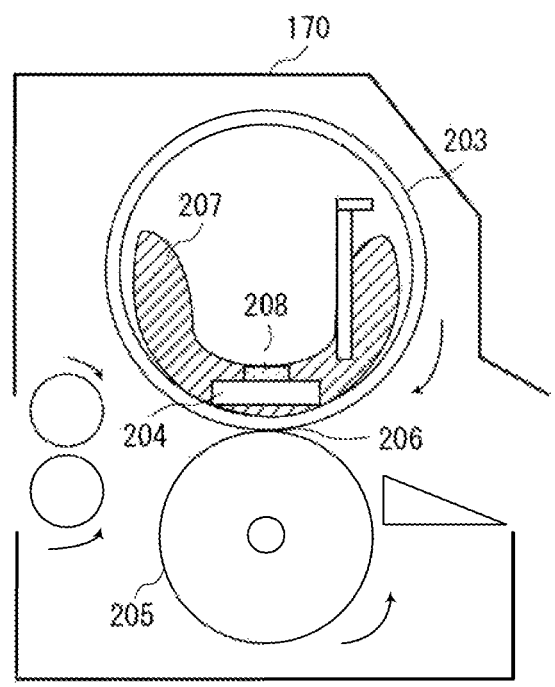
FIG. 3 is an explanatory view of a configuration of a fixing device.

FIG. 3 is an explanatory view of a configuration of the fixing device 170. The fixing device 170 includes an assembly and a pressure roller 205. The assembly includes a heater holder 207, a fixing heater 204, and a fixing film 203 serving as an elastic layer. The heater holder 207 is a U-shaped member extending in a depth direction of FIG. 3. The fixing heater 204 is fixed and arranged on a lower surface of the heater holder 207 along a longitudinal direction of the heater holder 207. The pressure roller 205 includes a core metal extending in the longitudinal direction of the heater holder 207. In the pressure roller 205, both end portions of the core metal are arranged between side plates of the fixing device 170 so as to be freely rotatable by bearings. The fixing heater 204 is arranged on the pressure roller 205 side inside of the fixing film 203 so as to be parallel to the pressure roller 205. The fixing heater 204 and the fixing film 203 are urged by a predetermined pressing force toward the pressure roller 205 side.

The fixing heater 204 is brought into pressure-contact with the pressure roller 205 across the fixing film 203 so that a fixing nip portion 206 having a predetermined width is formed. The pressure roller 205 is driven to rotate by a drive mechanism (not shown) at a predetermined circumferential speed in a counterclockwise direction. The fixing film 203 is rotated in a clockwise direction in association with the rotation of the pressure roller 205. The medium is applied with pressure and heat at the fixing nip portion 206 so that the toner image is fixed, and is conveyed from the fixing device 170 to the downstream side due to the rotation of the pressure roller 205.

The fixing heater 204 has a configuration in which a resistance heating element is formed on a ceramic substrate. A temperature sensor 208 is provided in abutment against the fixing heater 204. The CPU 10 detects a temperature of the fixing heater 204 based on a detection result obtained by the temperature sensor 208. The CPU 10 controls, based on the detected temperature of the fixing heater 204, power to be supplied to the fixing heater 204 so that the fixing heater 204 reaches a predetermined target temperature. The CPU 10 performs feedback control on the temperature of the fixing heater 204 as described above.

The target temperature of the fixing heater 204 is determined based on the type of media to be passed, an environment temperature, and the like. The CPU 10 determines the target temperature based on the type of media set through the operation unit 13 or on the media characteristic detected by the media sensor 14. When the media are thin paper thinner than plain paper, the target temperature of the fixing heater 204 is determined to be lower than the target temperature for the plain paper, and when the media are thick paper thicker than the plain paper, the target temperature of the fixing heater 204 is determined to be higher than the target temperature for the plain paper. When a sensor for measuring the environment temperature is provided to the image forming apparatus 100, the CPU 10 determines the target temperature in consideration of also the environment temperature in addition to the type of media (or the media characteristic).

<Media Sensor>

Figure 4:
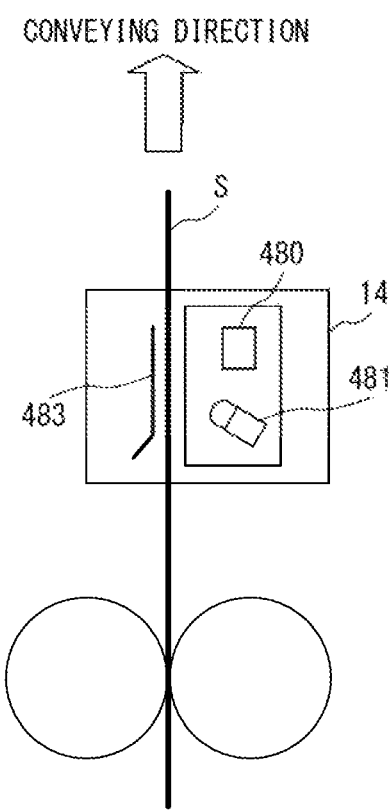
FIG. 4 is an explanatory view of a configuration of a media sensor.

FIG. 4 is an explanatory view of a configuration of the media sensor 14. The media sensor 14 is an optical sensor including a light emitting diode (LED) 481, a photodiode 480, and a guide member 483. The LED 481 serves as a light emitting portion. The photodiode 480 serves as a light receiving portion. The guide member 483 guides the supply of a medium S. The LED 481 irradiates the medium S with light. The photodiode 480 receives the reflected light reflected by the medium S. The photodiode 480 outputs an electrical signal corresponding to the received reflected light.

The CPU 10 obtains the electrical signal output from the photodiode 480 as the output value of the media sensor 14. The output value is a value corresponding to the media characteristic. The CPU 10 detects the media characteristic of the media being passed (material, thickness, or the like of the medium S) based on the output value, and distinguishes the type of the medium S. The CPU 10 adjusts the image forming condition based on the distinguished type of the medium S. For example, the CPU 10 controls the image forming speed to an optimum speed and determines the target temperature of the fixing device 170.

When the media sensor 14 is used, the user is not required to set the type of media through use of the operation unit 13. Accordingly, in the image forming apparatus 100 according to the first embodiment, a media automatic detection mode of automatically distinguishing the type of media by the media sensor 14 is set as the default operation mode. Depending on the type of media, the media sensor 14 may erroneously detect the media, and the quality of the printed product may be reduced. Accordingly, as the operation mode, the user can set a user instruction mode of manually setting the type of media. In order to distinguish the type of media by the media sensor 14, it is required that one or more sheets be caused to pass through the detection position of the media sensor 14.

The configuration of the media sensor 14 is not limited to that of FIG. 4. For example, the media sensor 14 may be formed by combining the optical sensor including the light emitting portion and the light receiving portion and an ultrasonic sensor using a piezoelectric device or the like. The ultrasonic sensor allows detection of the basis weight of the media, and thus the detection accuracy of the media characteristic (type) is improved. Further, a sensor for detecting another media characteristic may be combined with the media sensor 14.

<Tone Correction>

Tone correction refers to calibration for adjusting the density of the image to be formed by the image forming apparatus 100. When the tone correction is executed, a plurality of image forming conditions affecting the density (color) of the image are updated. In this case, transfer efficiency at the time of transferring the toner image onto the medium and a change in color balance of the image at the time of performing fixing by the fixing device 170 are corrected. The image forming condition has an optimum value which varies depending on the media characteristic such as the basis weight or the surface property of the media. Accordingly, it is required to perform the calibration for each media characteristic (each type of media).

In order to perform the tone correction, an adjustment chart is created by printing a test image on a medium. The color of the adjustment chart is measured by the image reading unit 300. The medium to be used for the adjustment chart is the medium having the media characteristic (type) selected when the tone correction is executed. For example, at the time of the tone correction of plain paper, the test image is printed on the plain paper, and at the time of the tone correction of thick paper or coated paper, the test image is printed on the thick paper or the coated paper.

The CPU 10 derives a correction parameter (correction value) for eliminating a difference between a color measurement result obtained by the image reading unit 300 and a target value stored in advance in the ROM 11, and stores the correction parameter (correction value) into the RAM 12. The correction parameter is read out at the time of the subsequent print job in accordance with the media characteristic of the media to be used, and is applied to the adjustment of the image forming condition.

In the first embodiment, the color of the test image is measured through use of the image reading unit 300 mounted to the image forming apparatus 100, but the color may be measured through use of an external color measurement device and a print server. Further, there may be employed a configuration in which the color of the test image is measured by providing a color measurement device on the conveyance path (for example, on the conveyance path 231) through which the media are conveyed of the image forming apparatus 100.

In the first embodiment, the detection result obtained by the media sensor 14 is stored into the RAM 12 for each sheet feeding cassette. At the time of the tone correction, the user selects the sheet feeding cassette. Accordingly, a selection screen for selecting a sheet feeding cassette is displayed on the display of the operation unit 13. In the selection screen, a selectable sheet feeding cassette and a non-selectable sheet feeding cassette are displayed in a distinguishable manner based on the detection result.

Figure 5A:
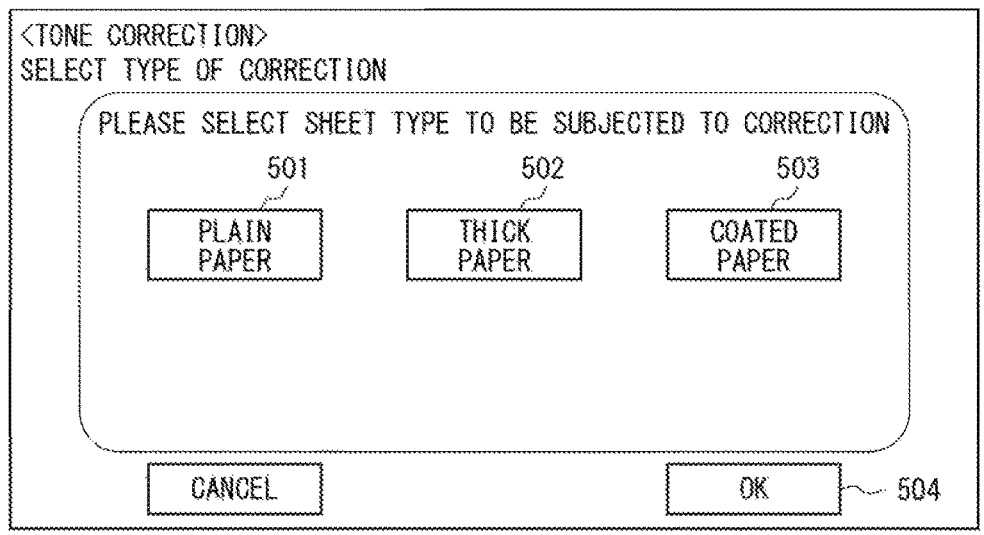
FIG. 5A, FIG. 5B, and FIG. 5C are exemplary views of a sheet feeding cassette selection screen.
Figure 5B:
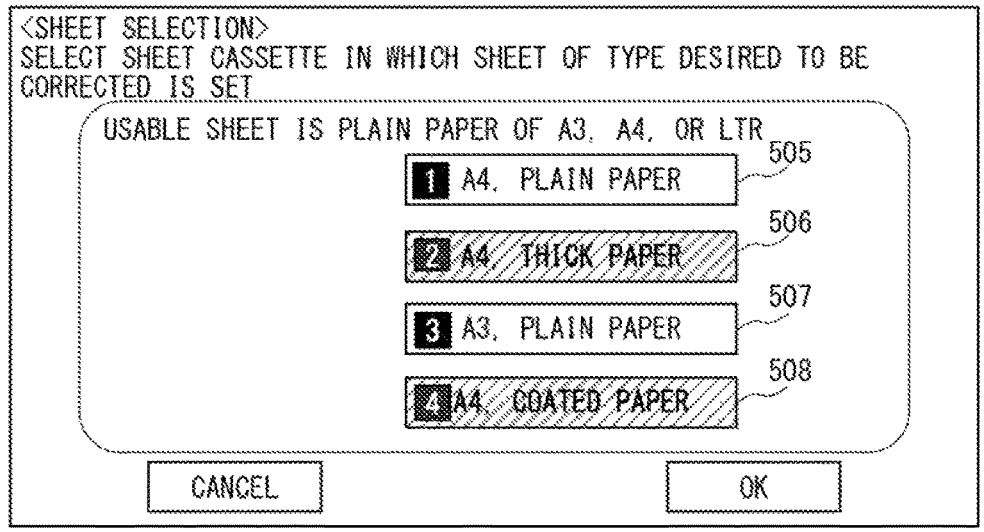
Figure 5C:
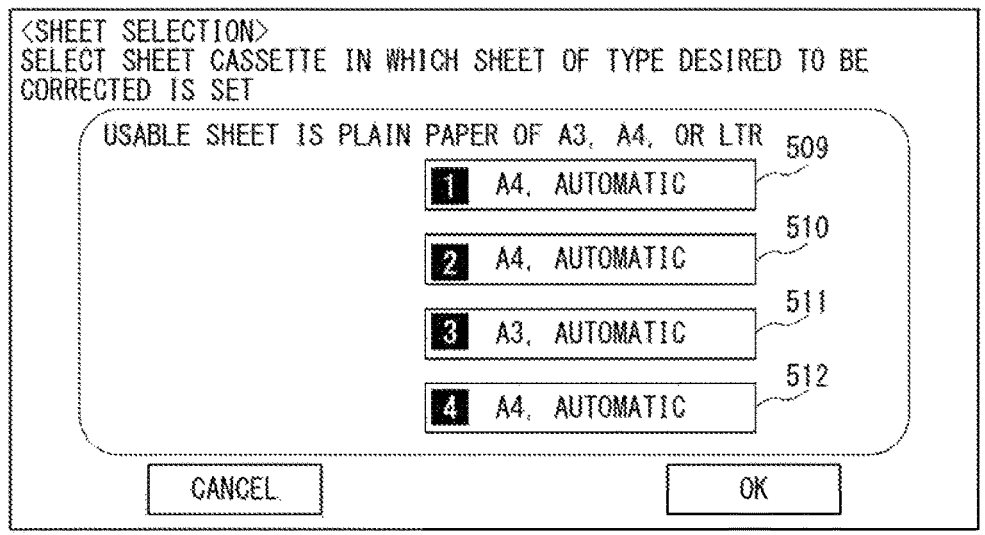

FIG. 5A to FIG. 5C and FIG. 6 are exemplary views of the selection screen for selecting the sheet feeding cassette in which the media to be used in the tone correction have been stored. FIG. 5A shows an example of a media selection screen. Though the media selection screen, the media characteristic (type of media) to be used in the image formation is selected. In the media selection screen of FIG. 5A, any of a selection button 501 for "plain paper," a selection button 502 for "thick paper," or a selection button 503 for "coated paper" can be selected. When any of the selection button 501, 502, or 503 is selected and an "OK" button 504 is pressed, in the related art, a sheet feeding cassette selection screen exemplified in FIG. 5B or FIG. 5C is displayed. A description is given here of a case in which the "plain paper" is selected.

FIG. 5B shows an example of the sheet feeding cassette selection screen in a case in which the image forming apparatus 100 has no media sensor 14 mounted thereon. This sheet feeding cassette selection screen displays that the type of media required for the tone correction is the plain paper, and also displays the size and the media characteristic (type of media) of the media stored in each of the sheet feeding cassettes 220 to 223 at present. "Sheet feeding cassette" buttons 505 and 507 for the sheet feeding cassettes in which the plain paper to be used in the tone correction is stored are selectable. "Sheet feeding cassette" buttons 506 and 508 for the sheet feeding cassettes in which media other than the plain paper to be used in the tone correction are stored are grayed out so as not to be selectable. Accordingly, the user can select one of the selectable sheet feeding cassettes to be used in the tone correction. When the user selects the sheet feeding cassette, the medium is fed from the selected sheet feeding cassette, and the test image for the tone correction is printed thereon.

FIG. 5C shows an example of the related-art sheet feeding cassette selection screen in a case in which the image forming apparatus 100 has the media sensor 14 mounted thereon. Similarly to FIG. 5B, this sheet feeding cassette selection screen displays that the type of media required for the tone correction is the plain paper, and also displays the size of the media stored in each of the sheet feeding cassettes 220 to 223. However, the media characteristics (types of media) of the media stored in the respective sheet feeding cassettes 220 to 223 are all displayed as "automatic." In the image forming apparatus 100 having the media sensor 14 mounted thereon, the setting of "automatic" for detecting the media characteristic by the media sensor 14 is prepared. Through use of this setting, the user can use the image forming apparatus 100 without being conscious of the media characteristic of the media stored in the sheet feeding cassette. However, the user cannot recognize the media characteristic, and hence the sheet feeding cassette in which the plain paper is stored is unknown as illustrated in FIG. 5C. Accordingly, the user cannot select one of the "sheet feeding cassette" buttons 509 to 512 for the sheet feeding cassette in which the media for use in performing the tone correction have been stored.

Figure 6:
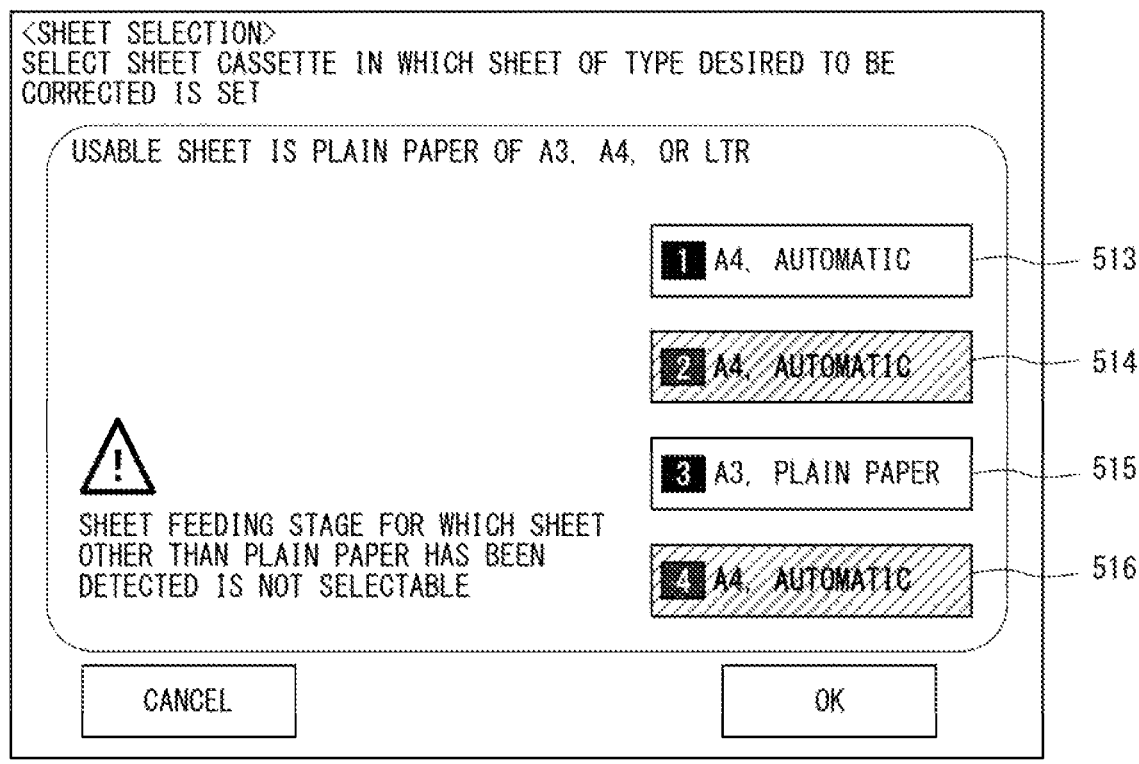
FIG. 6 is an exemplary view of the sheet feeding cassette selection screen.

In the first embodiment, when the type of media is selected in the media selection screen of FIG. 5A, the sheet feeding cassette selection screen exemplified in FIG. 6 is displayed. A description is given here of a case in which the "plain paper" is selected from the media selection screen. Similarly to FIG. 5C, the sheet feeding cassette selection screen of FIG. 6 displays that the type of media required for the tone correction is the plain paper, and also displays the size of media stored in each of the sheet feeding cassettes 220 to 223. The media characteristic (types of media) of the media stored in the sheet feeding cassette 222 is displayed as "PLAIN PAPER". Further, the media characteristics (types of media) of the media stored in the respective sheet feeding cassette 220, 221, 223 are all displayed as "automatic.". However, grayed-out and non-selectable "sheet feeding cassette" buttons 514 and 516 and selectable "sheet feeding cassette" buttons 513 and 515 are present.

The grayed-out "sheet feeding cassette" buttons 514 and 516 are buttons for sheet feeding cassettes for which the detection result obtained by the media sensor 14 and stored in the RAM 12 indicates media other than the plain paper. Accordingly, those media cannot be used in the tone correction of this time, and thus the "sheet feeding cassette" buttons 514 and 516 are not selectable. The "sheet feeding cassette" button 515 for the sheet feeding cassette for which the user has set the media characteristic and the "sheet feeding cassette" button 513 for the sheet feeding cassette for which the detection result obtained by the media sensor 14 has been the plain paper are selectable because the media can be used in the tone correction of this time. That is, the button for the sheet feeding cassette for which it is confirmed that the media usable in the tone correction are stored is selectable.

Figure 7:
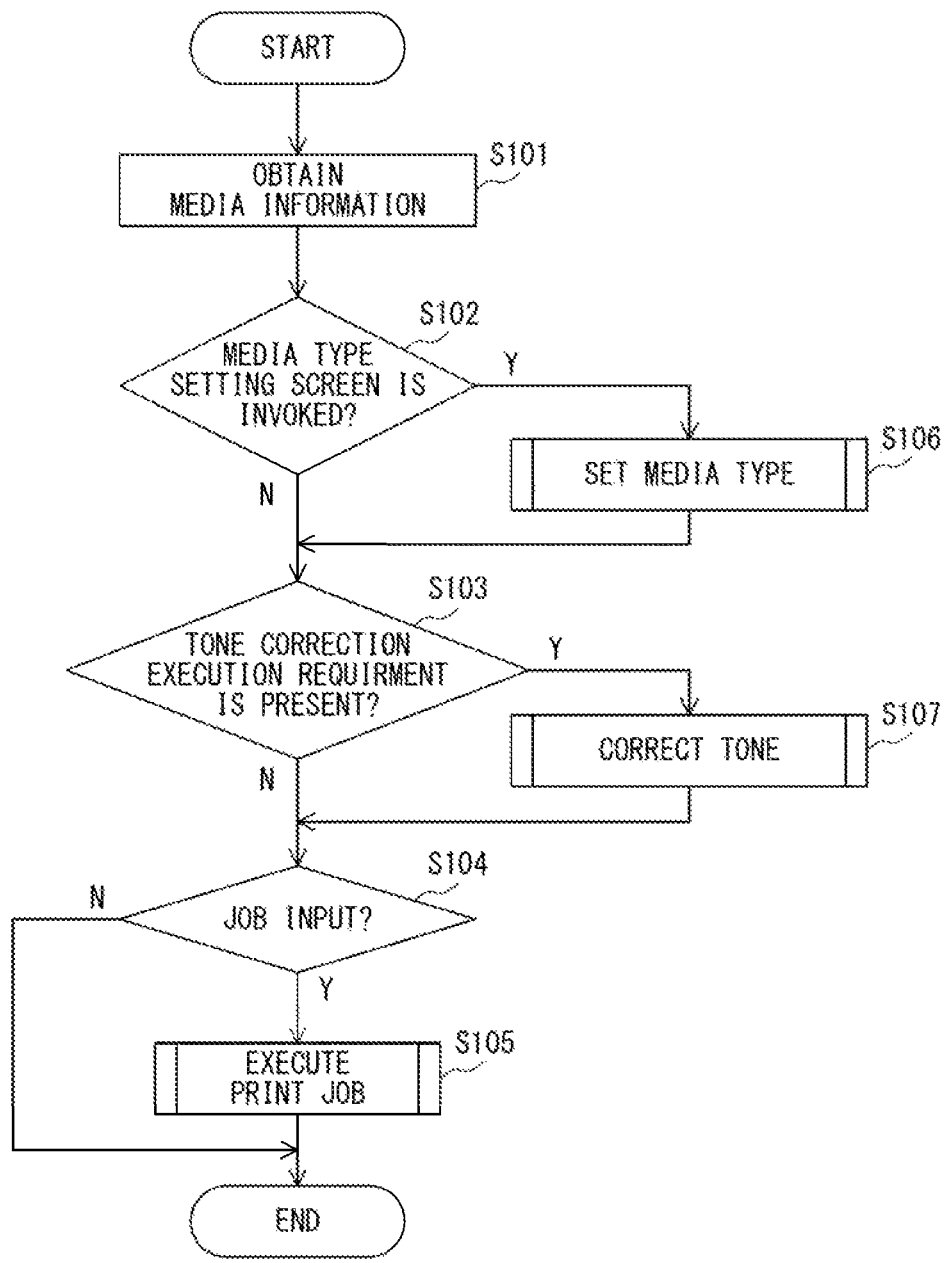
FIG. 7 is a flow chart for illustrating print processing accompanied by tone correction.

FIG. 7 is a flow chart for illustrating print processing accompanied by the tone correction. The sequence of this processing is stored in the ROM 11 as a computer program, and is executed by the CPU 10. A description is given here of the tone correction as an example, but similar processing can be performed even for other correction of the image forming condition, for example, color misregistration.

When the image forming apparatus 100 is powered on, the CPU 10 obtains media information on the media stored in each of the sheet feeding cassettes 220 to 223, which is stored in the RAM 12 (Step S101). FIG. 8 is an exemplary table of the media information. The media information includes the size of media, the media characteristic, and the detection result obtained by the media sensor 14. The media characteristic indicates the type of media, but when the media characteristic is "automatic," there is employed a setting in which the detection result obtained by the media sensor 14 is used. In the first embodiment, "automatic" is set as the default value of the media characteristic.

Symbol "-" is set as the detection result obtained by the media sensor 14 of the third sheet feeding cassette. This symbol indicates that the media characteristic is not "automatic," and hence there is no detection result obtained by the media sensor 14. A word "unknown" is set as the detection result obtained by the media sensor 14 of the fourth sheet feeding cassette. This word indicates that no medium has yet to be fed from the corresponding sheet feeding cassette, and hence there is no detection result obtained by the media sensor 14. The section of the detection result obtained by the media sensor 14 is set when one or more media is fed so that the media sensor 14 detects the one or more media.

The CPU 10 determines whether or not a media type setting screen has been invoked through the operation unit 13 (Step S102). When the media type setting screen has been invoked (Step S102: Y), the CPU 10 displays the media type setting screen on the operation unit 13, and performs the setting of the media type (Step S106). Details of the setting of the media type are described later. When the media type setting screen has not been invoked (Step S102: N), or after the setting of the media type is finished, the CPU 10 determines the presence or absence of a tone correction execution requirement (Step S103). The tone correction execution requirement is input by the user through use of the operation unit 13. When the tone correction execution requirement is input, for example, the media selection screen of FIG. 5A is displayed.

When the tone correction execution requirement is present (Step S103: Y), the CPU 10 executes the tone correction to be described later (Step S107). When the tone correction execution requirement is absent (Step S103: N), or after the tone correction is executed, the CPU 10 determines whether or not the print job has been input (Step S104). When the print job has been input (Step S104: Y), the CPU 10 executes the print job to be described later (Step S105). When no print job has been input (Step S104: N), or after the print job is ended, the CPU 10 ends the processing. After the processing is ended, the CPU 10 may return to the process step of Step S102 so as to determine whether or not the media type setting screen has been invoked through the operation unit 13.

Figure 9:
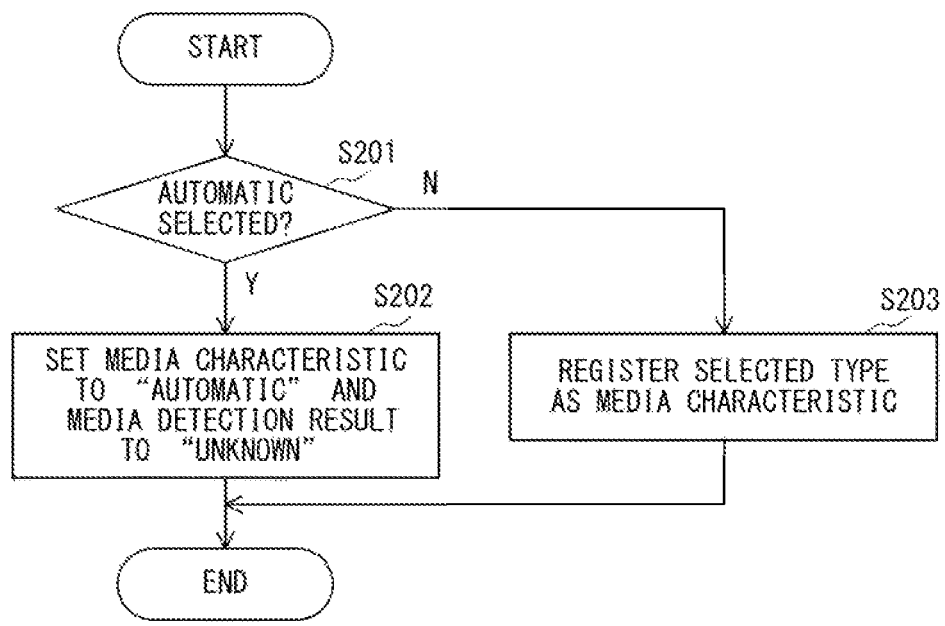
FIG. 9 is a flow chart for illustrating media type setting processing.
Figure 10:
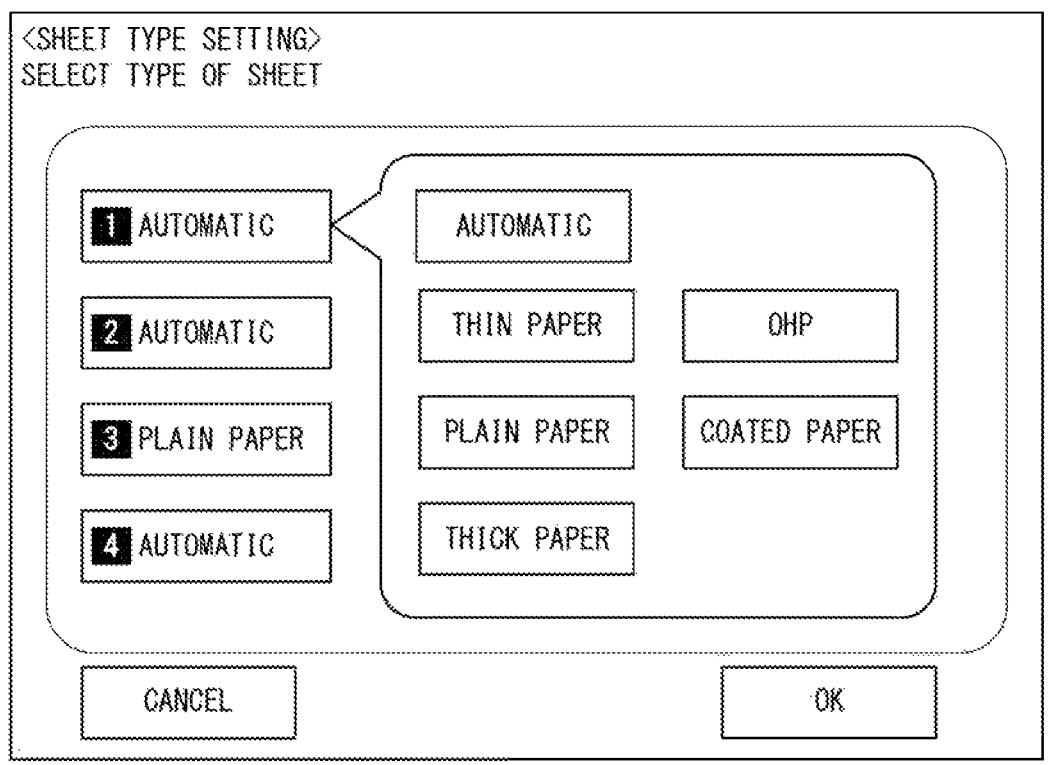
FIG. 10 is an exemplary view of a media type setting screen.

FIG. 9 is a flow chart for illustrating the media type setting processing of Step S106. FIG. 10 is an exemplary view of the media type setting screen. In the media type setting processing, as exemplified in FIG. 10, the media characteristic of the media stored in each of the sheet feeding cassettes 220 to 223 is set. The image forming apparatus 100 according to the first embodiment includes four sheet feeding cassettes 220 to 223, and the media characteristic of the media stored in each of the sheet feeding cassettes 220 to 223 can be set. When the user recognizes the media characteristic such as the plain paper or the thick paper, the user sets the type of media stored in the sheet feeding cassette from the setting screen. Further, "automatic" indicating the media automatic detection mode to be performed by the media sensor 14 included in the image forming apparatus 100 is also selectable through the media type setting screen.

When "automatic" is selected from the media type setting screen (Step S201: Y), the CPU 10 sets the media characteristic to "automatic," and sets the detection result obtained by the media sensor 14 of the media information (FIG. 8) to "unknown" (Step S202). When an item other than "automatic" is selected from the media type setting screen (Step S201: N), the CPU 10 registers the selected type of media as the media characteristic (Step S203). As described above, the type of media (media characteristic) is set through use of the media type setting screen of FIG. 10.

Figure 11:
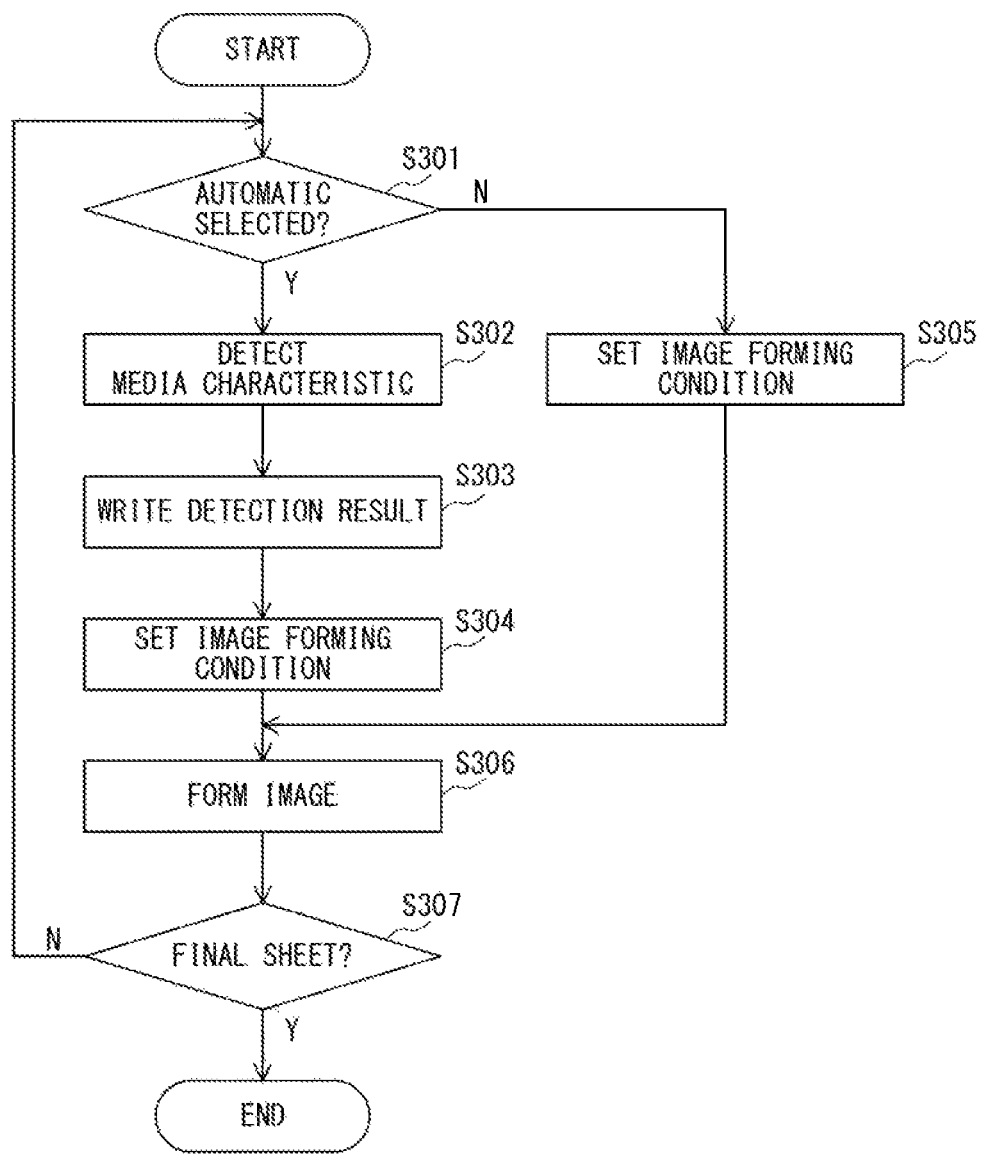
FIG. 11 is a flow chart for illustrating processing to be performed when a print job is executed.

FIG. 11 is a flow chart for illustrating the processing to be performed when the print job is executed in Step S105.

When the print job is input, the CPU 10 refers to the media information (FIG. 8) stored in the RAM 12 to determine whether or not the media characteristic is set to "automatic" (Step S301). When the media characteristic is "automatic" (Step S301: Y), the CPU 10 automatically detects the media characteristic by the media automatic detection mode performed by the media sensor 14 (Step S302). The CPU 10 writes a detection result of the media characteristic obtained by the media sensor 14 into the media information of the RAM 12 (Step S303). The CPU 10 sets the image forming condition based on the detection result of the media characteristic obtained by the media sensor 14 (Step S304). When the media characteristic is not set to "automatic" (Step S301: N), the CPU 10 sets the image forming condition based on the media characteristic set in the media information (Step S305).

The CPU 10 which has set the image forming condition forms an image on the medium in accordance with the print job (Step S306). The CPU 10 repeatedly performs the process steps of from Step S301 to Step S306 until the final sheet of the print job (Step S307: N). After the CPU 10 ends the image forming processing until the final sheet of the print job (Step S307: Y), the CPU 10 ends the processing corresponding to the print job.

Figure 12:
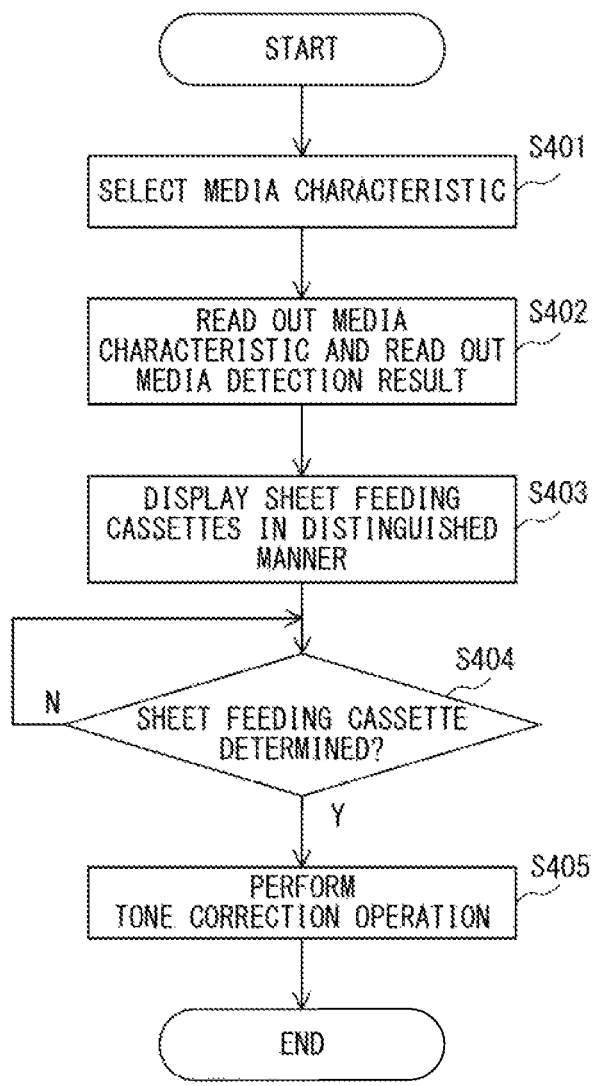
FIG. 12 is a flow chart for illustrating tone correction processing.

FIG. 12 is a flow chart for illustrating the tone correction processing of Step S107. The tone correction is started when the type of media is selected from the media selection screen of FIG. 5A.

The CPU 10 which has started the tone correction selects the media characteristic required for the tone correction in accordance with the type of media selected from the media selection screen (Step S401). The CPU 10 reads out, from the media information, the media detection result and the media characteristic of the media stored in each of the sheet feeding cassettes 220 to 223 (Step S402). The CPU 10 compares the media characteristic selected in the process step of Step S401 with the media characteristic read out in Step S402, and displays, as exemplified in FIG. 6, the sheet feeding cassette selection screen in which the selectable sheet feeding cassette and the non-selectable sheet feeding cassette are distinguished from each other (Step S403).

The user gives, through the operation unit 13, an instruction on the sheet feeding cassette in which the media to be used in the tone correction are stored from the sheet feeding cassette selection screen. The CPU 10 obtains, from the operation unit 13, the instruction on the sheet feeding cassette in which the media to be used in the tone correction are stored, and determines the sheet feeding cassette to be used (Step S404: Y). The CPU 10 starts the feeding of the medium from the determined sheet feeding cassette so as to execute the tone correction (Step S405). The CPU 10 prints the test image on the medium so as to create the adjustment chart. The color of the adjustment chart is measured by the image reading unit 300. The CPU 10 performs the tone correction based on the color measurement result of the adjustment chart obtained by the image reading unit 300.

As described above, the image forming apparatus 100 allows the user to select an appropriate sheet feeding cassette even in the media automatic detection mode of performing the setting for detecting the media characteristic by the media sensor 14. Accordingly, the image forming apparatus 100 can form the test image on an appropriate type of medium, and can adjust the image forming condition. Thus, the image forming apparatus 100 can prevent the quality of the printed product from being reduced.

The instruction on the media automatic detection mode or the like can also be set from, other than the operation unit 13, an external device such as a personal computer including a printer driver. Further, even when the image forming apparatus 100 has a configuration in which the media are fed not only from the sheet feeding cassette but also from a manual feed tray, the first embodiment can be applied thereto so that a similar effect can be obtained. Moreover, as long as the image forming apparatus 100 is configured to perform, other than the tone correction, calibration of printing the test image on the medium, the first embodiment can be applied thereto so that a similar effect can be obtained.

Second Embodiment

Configurations of the image forming apparatus 100 and the control unit 9 in a second embodiment of the present disclosure are similar to those of the first embodiment, and hence description thereof is omitted. The image forming apparatus 100 according to the second embodiment displays, when the sheet feeding cassette to be used is selected, the detection result obtained by the media sensor 14 on the sheet feeding cassette selection screen. Accordingly, the user can refer to the detection result obtained by the media sensor 14 so as to recognize the usable sheet feeding cassette, and can determine the sheet feeding cassette to be used.

Figure 13:
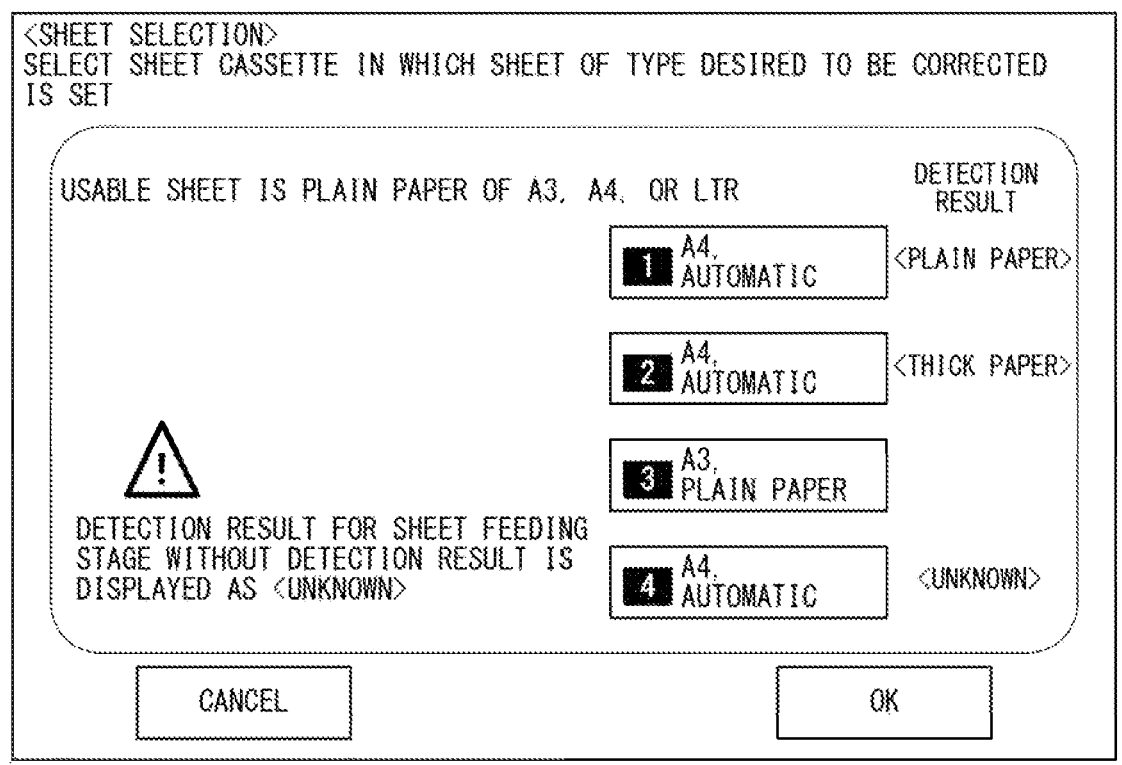
FIG. 13 is an exemplary view of the sheet feeding cassette selection screen.

When a predetermined medium (in this case, the "plain paper") is selected from the media selection screen of FIG. 5A, the CPU 10 displays the sheet feeding cassette selection screen exemplified in FIG. 13 on the operation unit 13. Similarly to FIG. 6, the sheet feeding cassette selection screen displays that the type of media required for the tone correction is the plain paper, and also displays the size of media stored in each of the sheet feeding cassettes 220 to 223. The media characteristic (types of media) of the media stored in the sheet feeding cassette 222 is displayed as "PLAIN PAPER". Further, the media characteristics (types of media) of the media stored in the respective sheet feeding cassettes 220, 221, 223 are all displayed as "automatic." The detection result obtained by the media sensor 14 is displayed adjacent to the selection button for the sheet feeding cassette.

The user can refer to the detection result on the selection screen and select the sheet feeding cassette in which the media to be used in the tone correction are stored. The sheet feeding cassette from which no sheet has been caused to pass is displayed as <unknown> because no medium has been detected by the media sensor 14.

Figure 14:
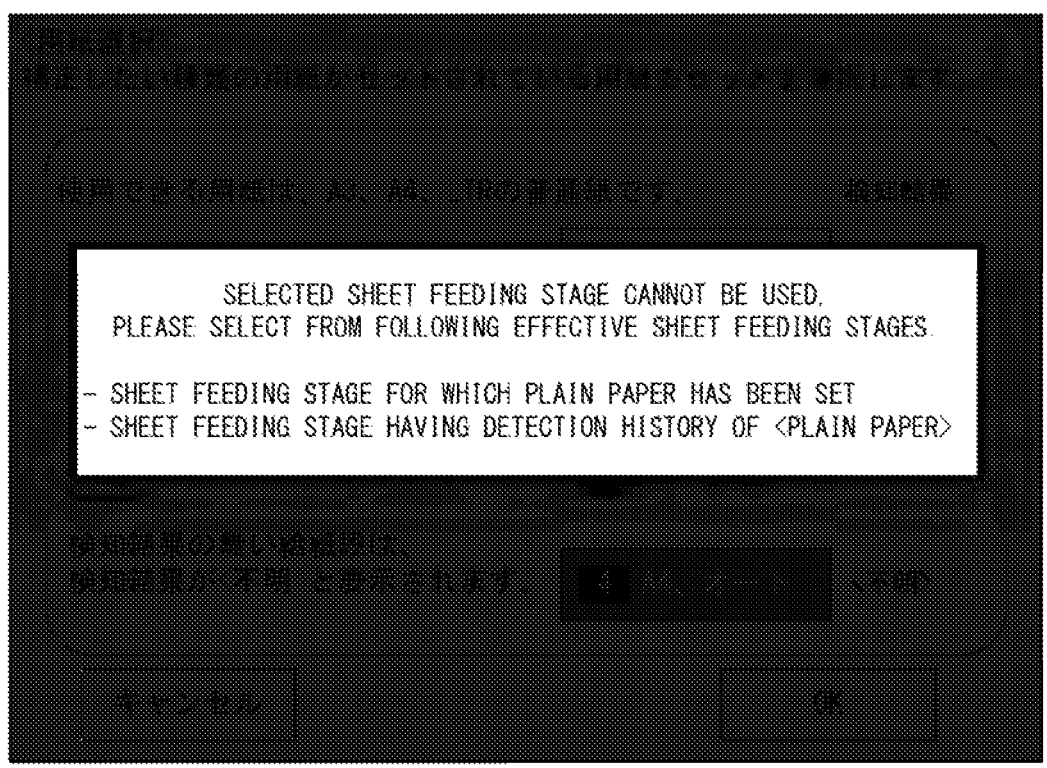
FIG. 14 is an exemplary view of a notification screen.

When the user selects, from the selection screen, a sheet feeding cassette in which media that cannot be used in the tone correction have been stored, or when the user selects a sheet feeding cassette displayed as <unknown>, the CPU 10 displays a message indicating that the media in the sheet feeding cassette cannot be used. Further, the CPU 10 issues a notification of a determination method for a usable sheet feeding cassette. FIG. 14 is an exemplary view of a notification screen to be used for such a notification.

<Tone Correction>

Figure 15:
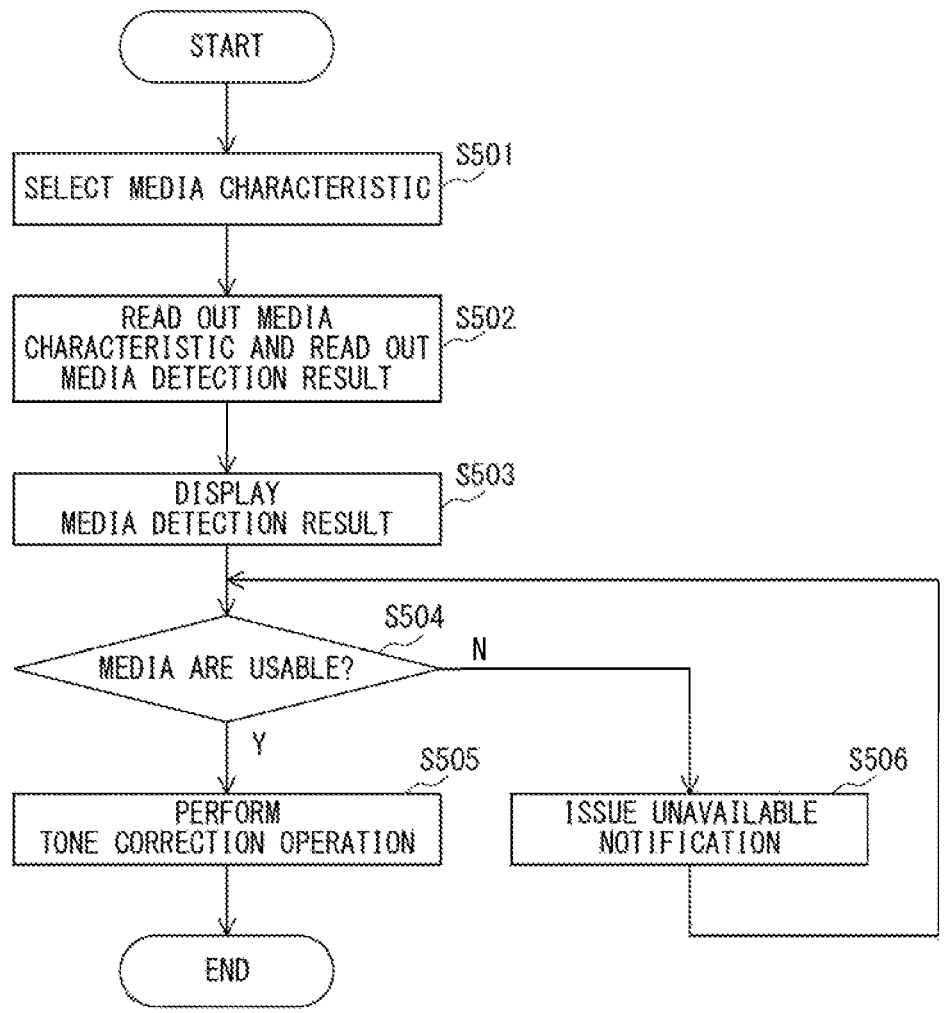
FIG. 15 is a flow chart for illustrating the tone correction processing.

In the second embodiment, the print processing accompanied by the tone correction itself is similar to that of the first embodiment, but the tone correction processing of Step S107 (see FIG. 7) is different. FIG. 15 is a flow chart for illustrating the tone correction processing of Step S107 in the second embodiment. Similarly to the first embodiment, the tone correction processing is started when the type of media is selected from the media selection screen of FIG. 5A.

The CPU 10 which has started the tone correction selects the media characteristic required for the tone correction in accordance with the type of media selected from the media selection screen (Step S501). The CPU 10 reads out, from the media information, the media detection result and the media characteristic of the media stored in each of the sheet feeding cassettes 220 to 223 (Step S502). The CPU 10 displays the sheet feeding cassette selection screen (FIG. 13) indicating the read-out media detection result on the operation unit 13 (Step S503). At this time, the detection result obtained by the media sensor 14 is displayed for the sheet feeding cassette for which the detection result obtained by the media sensor 14 is present, and a display indicating that there is no detection result obtained by the media sensor 14 is performed for the sheet feeding cassette for which the detection result obtained by the media sensor 14 is absent. In the second embodiment, as illustrated in FIG. 13, <unknown> is displayed for the sheet feeding cassette for which the detection result obtained by the media sensor 14 is absent.

The user refers to the detection result obtained by the media sensor 14 through the sheet feeding cassette selection screen so as to select the sheet feeding cassette in which the media to be used in the tone correction have been stored, and transmits the selection content to the CPU 10 through the operation unit 13. The CPU 10 compares the media characteristic of the media stored in the sheet feeding cassette selected by the user through the operation unit 13 with the media characteristic selected in the process step of Step S501. In this manner, the CPU 10 determines whether or not the media stored in the sheet feeding cassette selected by the user are usable in the tone correction (Step S504). When the media are usable (Step S504: Y), the CPU 10 starts feeding of the medium from the sheet feeding cassette designated by the user so as to execute the tone correction (Step S505). A case in which the media are usable refers to a case in which, for example, the media characteristic of the media stored in the sheet feeding cassette selected by the user and the media characteristic selected in the process step of Step S501 match each other. The CPU 10 prints the test image on the medium so as to create the adjustment chart. The color of the adjustment chart is measured by the image reading unit 300. The CPU 10 performs the tone correction based on the color measurement result of the adjustment chart obtained by the image reading unit 300.

When the media are unusable (Step S504: N), the CPU 10 issues an unavailable notification indicating that the media stored in the sheet feeding cassette selected by the user cannot be used in the tone correction (Step S506). A case in which the media are unusable refers to a case in which, for example, the media characteristic of the media stored in the sheet feeding cassette selected by the user and the media characteristic selected in the process step of Step S501 do not match each other. Further, the media are determined as unusable also in a case in which the detection result obtained by the media sensor 14 of the media stored in the sheet feeding cassette selected by the user is <unknown>. The CPU 10 issues the unavailable notification by, for example, displaying the notification screen of FIG. 14 on the operation unit 13. Through the unavailable notification, the user is urged to re-select the sheet feeding cassette to be used in the tone correction. In the notification screen, the determination method for the usable sheet feeding cassette is also given. When the user re-selects the sheet feeding cassette to be used in the tone correction, the process steps of Step S504 and thereafter are performed again.

Figure 16:
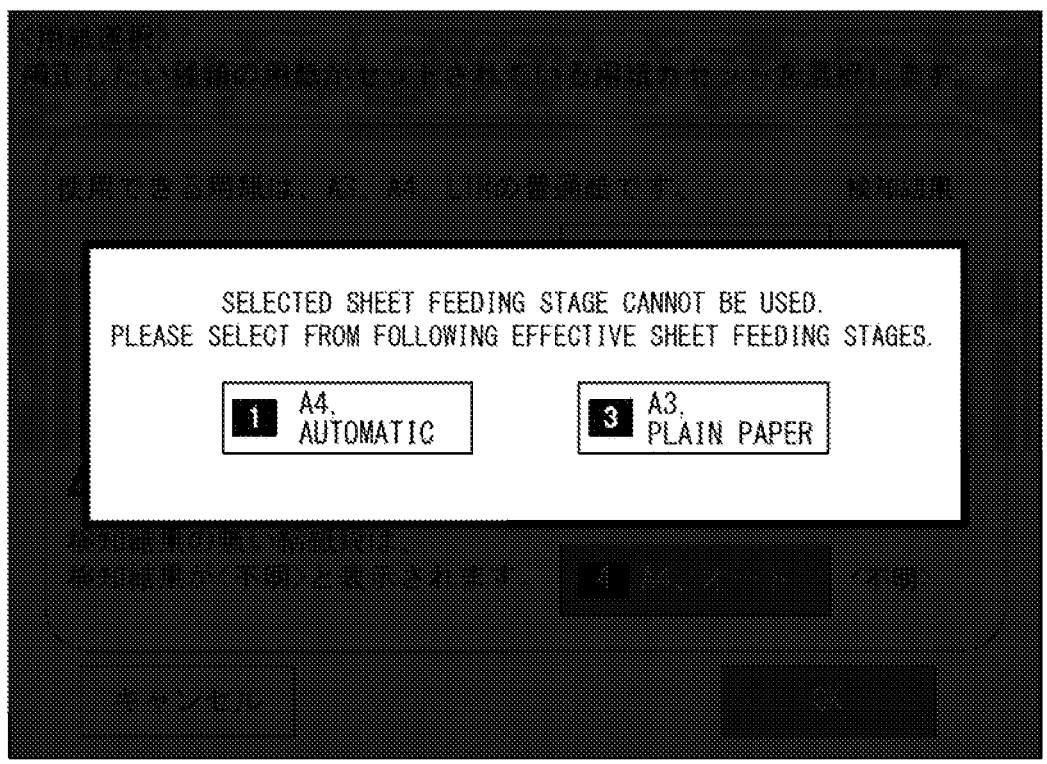
FIG. 16 is an exemplary view of the notification screen.

The unavailable notification may be issued through a notification screen exemplified in FIG. 16. In the notification screen of FIG. 16, the usable media are presented more specifically, and an instruction to select the sheet feeding cassette in which the usable media are stored is given.

The image forming apparatus 100 according to the second embodiment described above can prevent, when the tone correction is performed in accordance with the media characteristic, the user from selecting the sheet feeding cassette in which the media inappropriate for the tone correction have been stored. Accordingly, the image forming apparatus 100 can form the test image on an appropriate type of media, and can adjust the image forming condition. Thus, the image forming apparatus 100 can prevent the quality of the printed product from being reduced.

Third Embodiment

Configurations of the image forming apparatus 100 and the control unit 9 in a third embodiment of the present disclosure are similar to those of the first embodiment, and hence description thereof is omitted.

The toner image transferred onto the medium is applied with heat and pressure at the fixing nip portion 206 of the fixing device 170 so that the toner image is fixed to the medium. When the toner image is fixed at the fixing nip portion 206, some toner adheres to the surface of the fixing film 203 without being fixed to the medium. Such toner is referred to as "offset toner." The offset toner returns to the fixing nip portion 206 due to the rotation of the fixing film 203, and sometimes adheres to a subsequent medium at the time of the fixing of the subsequent medium, to thereby cause an image defect. Accordingly, it is required to regularly clean the fixing device 170.

<Cleaning of Fixing Device 170>

Fixing cleaning for removing the offset toner is performed by causing a cleaning sheet created by printing a cleaning image on a medium to pass through the fixing device 170. A toner image of the cleaning image is heated at the fixing nip portion 206 so as to be melted and have tackiness. Through use of this tackiness, the offset toner adhering to the surface of the fixing film 203 is collected. It is required to print the cleaning image on a sheet and cause the sheet to pass through the fixing device 170, and hence parameters such as the image forming condition and the fixing temperature are determined in advance. Accordingly, the media characteristic (type) of the media usable in the fixing cleaning is also limited.

Figure 17:
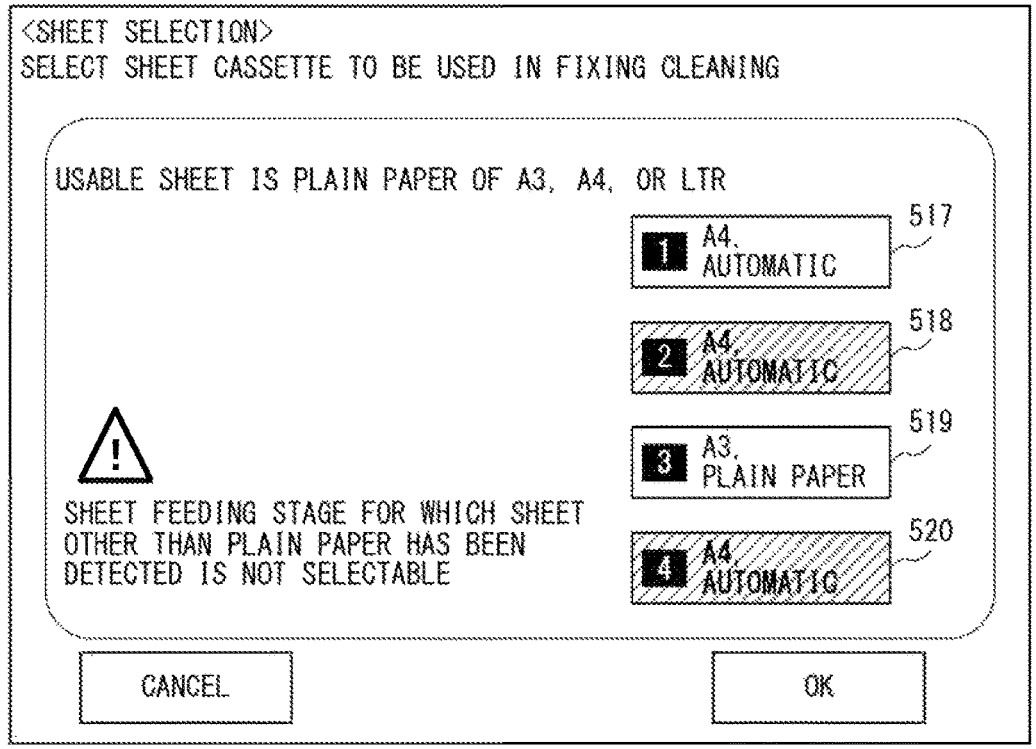
FIG. 17 is an exemplary view of a fixing cleaning instruction screen.

The fixing cleaning is performed in response to an instruction given by the user through the operation unit 13. FIG. 17 is an exemplary view of a fixing cleaning instruction screen. In this instruction screen, a sheet feeding cassette in which media to be used for the cleaning sheet are stored is selected. In the instruction screen, selection buttons 517 and 519 for the sheet feeding cassette for which the plain paper has been set by the user and the sheet feeding cassette for which the detection result obtained by the media sensor 14 has been set to the plain paper are displayed as selectable candidates. Selection buttons 518 and 520 for the sheet feeding cassettes in which the media unusable in the fixing cleaning are stored are grayed out so as not to be selectable.

The user selects, from the instruction screen, the sheet feeding cassette in which the media usable in the fixing cleaning are stored. The image forming apparatus 100 feeds the medium from the selected sheet feeding cassette so as to create the cleaning sheet. The cleaning sheet is caused to pass through the fixing device 170 so that the fixing device 170 is cleaned.

In the image forming apparatus 100 according to the third embodiment described above, when the fixing cleaning is performed, the user can select without hesitation the sheet feeding cassette in which the media suitable for the fixing cleaning are stored. Accordingly, reduction in usability can be prevented. Further, the image forming apparatus 100 can perform the fixing cleaning with an appropriate type of media. Thus, the image forming apparatus 100 can prevent the quality of the printed product from being reduced.

The image forming apparatus 100 may display, on the instruction screen, the detection result of the media characteristic obtained by the media sensor 14 as illustrated in FIG. 13 instead of displaying the candidates of the sheet feeding cassette in which the media suitable for the fixing cleaning are stored. In this case, the user refers to the detection result so as to determine the sheet feeding cassette.

Fourth Embodiment

Configurations of the image forming apparatus 100 and the control unit 9 in a fourth embodiment of the present disclosure are similar to those of the first embodiment, and hence description thereof is omitted. The image forming apparatus 100 according to the fourth embodiment presents the user with the sheet feeding cassette for storing the media usable in the tone correction instead of causing the user to select the media to be used in the tone correction from the sheet feeding cassette selection screen exemplified in FIG. 6. The user stores the media having the media characteristic usable in the tone correction into the presented sheet feeding cassette, and transmits the instruction on the tone correction to the image forming apparatus 100.

Figure 18:
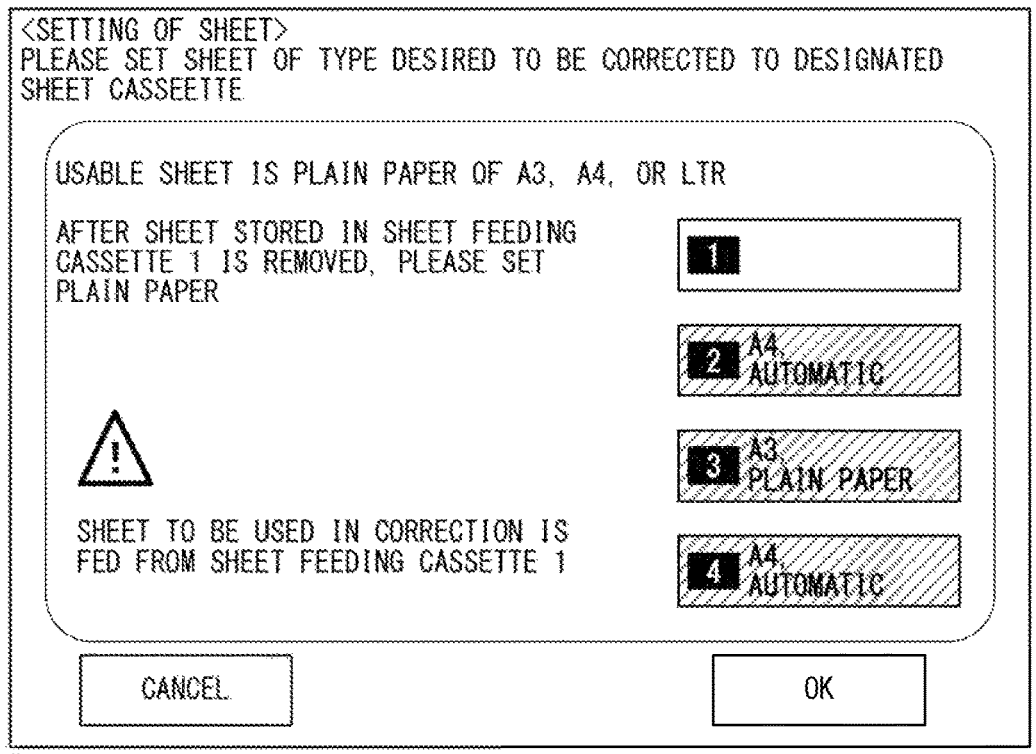
FIG. 18 is an exemplary view of a sheet feeding cassette instruction screen.

When the plain paper is selected in the media selection screen of FIG. 5A, instead of the sheet feeding cassette selection screen, a sheet feeding cassette instruction screen exemplified in FIG. 18 is displayed on the operation unit 13. Through the sheet feeding cassette instruction screen, an instruction on the sheet feeding cassette for storing the media to be used in the tone correction is given. The sheet feeding cassette instruction screen displays that the medium to be used when the tone correction is performed is the plain paper, and also displays the usable size and the sheet feeding cassette in which the media are stored.

The user stores the media having the media characteristic designated in the sheet feeding cassette instruction screen into the designated sheet feeding cassette. When media are already stored in the designated sheet feeding cassette, the user removes the media and then stores the designated media. After that, the user presses an "OK" button in the sheet feeding cassette instruction screen.

<Tone Correction>

Figure 19:
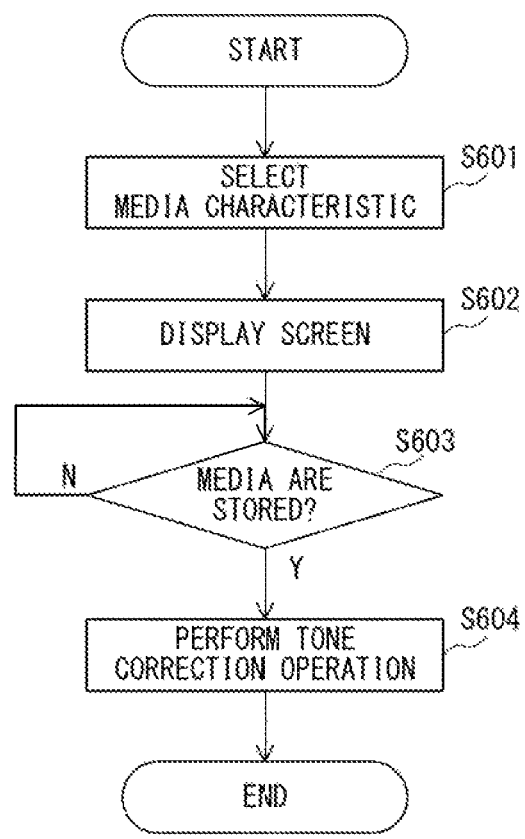
FIG. 19 is a flow chart for illustrating the tone correction processing.

In the fourth embodiment, the print processing accompanied by the tone correction itself is similar to that of the first embodiment, but the tone correction processing of Step S107 (see FIG. 7) is different. FIG. 19 is a flow chart for illustrating the tone correction processing of Step S107 in the fourth embodiment. Similarly to the first embodiment, the tone correction processing is started when the type of media is selected from the media selection screen of FIG. 5A.

The CPU 10 which has started the tone correction selects the media characteristic required for the tone correction in accordance with the type of media selected from the media selection screen (Step S601). The CPU 10 displays the sheet feeding cassette instruction screen exemplified in FIG. 18 on the operation unit 13 (Step S602). In this manner, an instruction on the type of media (media characteristic) to be used in the tone correction and the sheet feeding cassette for storing the media is given to the user. In the fourth embodiment, as illustrated in FIG. 18, the user is urged to store the media to be used in the tone correction into the first sheet feeding cassette (sheet feeding cassette 1).

After the user stores the designated media into the first sheet feeding cassette (sheet feeding cassette 1), the user presses the "OK" button. In this manner, the CPU 10 determines that the media have been stored in the designated sheet feeding cassette (Step S603: Y). The CPU 10 starts the feeding of the medium from the sheet feeding cassette designated in the sheet feeding cassette instruction screen so as to execute the tone correction (Step S604). The CPU 10 prints the test image on the medium so as to create the adjustment chart. The color of the adjustment chart is measured by the image reading unit 300. The CPU 10 performs the tone correction based on the color measurement result of the adjustment chart obtained by the image reading unit 300.

Even when the image forming apparatus 100 has a configuration in which the media are fed not only from the sheet feeding cassette but also from the manual feed tray, the fourth embodiment can be applied thereto so that a similar effect can be obtained. That is, the sheet feeding cassette instruction screen may give an instruction to place the media on the manual feed tray instead of the sheet feeding cassette.

The image forming apparatus 100 according to the fourth embodiment described above can form the test image on an appropriate type of media, and can adjust the image forming condition. Thus, the image forming apparatus 100 can prevent the quality of the printed product from being reduced. Further, even in a configuration in which, other than the tone correction, calibration of printing the test image on the medium is performed and in the fixing cleaning as described in the third embodiment, the fourth embodiment can be applied thereto so that a similar effect can be obtained.

Fifth Embodiment

Configurations of the image forming apparatus 100 and the control unit 9 in a fifth embodiment of the present disclosure are similar to those of the first embodiment, and hence description thereof is omitted. The image forming apparatus 100 according to the fifth embodiment gives, when there is no sheet feeding cassette in which the media to be used in the tone correction have been stored, to the user, an instruction on the media having the media characteristic to be used and the sheet feeding cassette for storing the media. The instruction in given through, for example, screen display onto the operation unit 13. The user stores the designated media having the media characteristic into the designated sheet feeding cassette, and instructs the image forming apparatus 100 to execute the tone correction. In response to this instruction, the image forming apparatus 100 executes the tone correction.

Figure 20:
FIG. 20 is an exemplary view of the sheet feeding cassette instruction screen.

When the plain paper is selected in the media selection screen of FIG. 5A, instead of the sheet feeding cassette selection screen, a sheet feeding cassette instruction screen exemplified in FIG. 20 is displayed on the operation unit 13. Through the sheet feeding cassette instruction screen, an instruction on the sheet feeding cassette for storing the media to be used in the tone correction is given. The sheet feeding cassette instruction screen displays that the medium to be used when the tone correction is performed is the plain paper, and also displays the usable size and the sheet feeding cassette in which the media are stored. Further, the sheet feeding cassette instruction screen displays that there is no sheet feeding cassette in which the usable media have been stored.

The user stores the media having the media characteristic designated in the sheet feeding cassette instruction screen into the designated sheet feeding cassette. After that, the user presses the "OK" button in the sheet feeding cassette instruction screen. In this manner, the image forming apparatus 100 performs the tone correction.

<Tone Correction>

Figure 21:
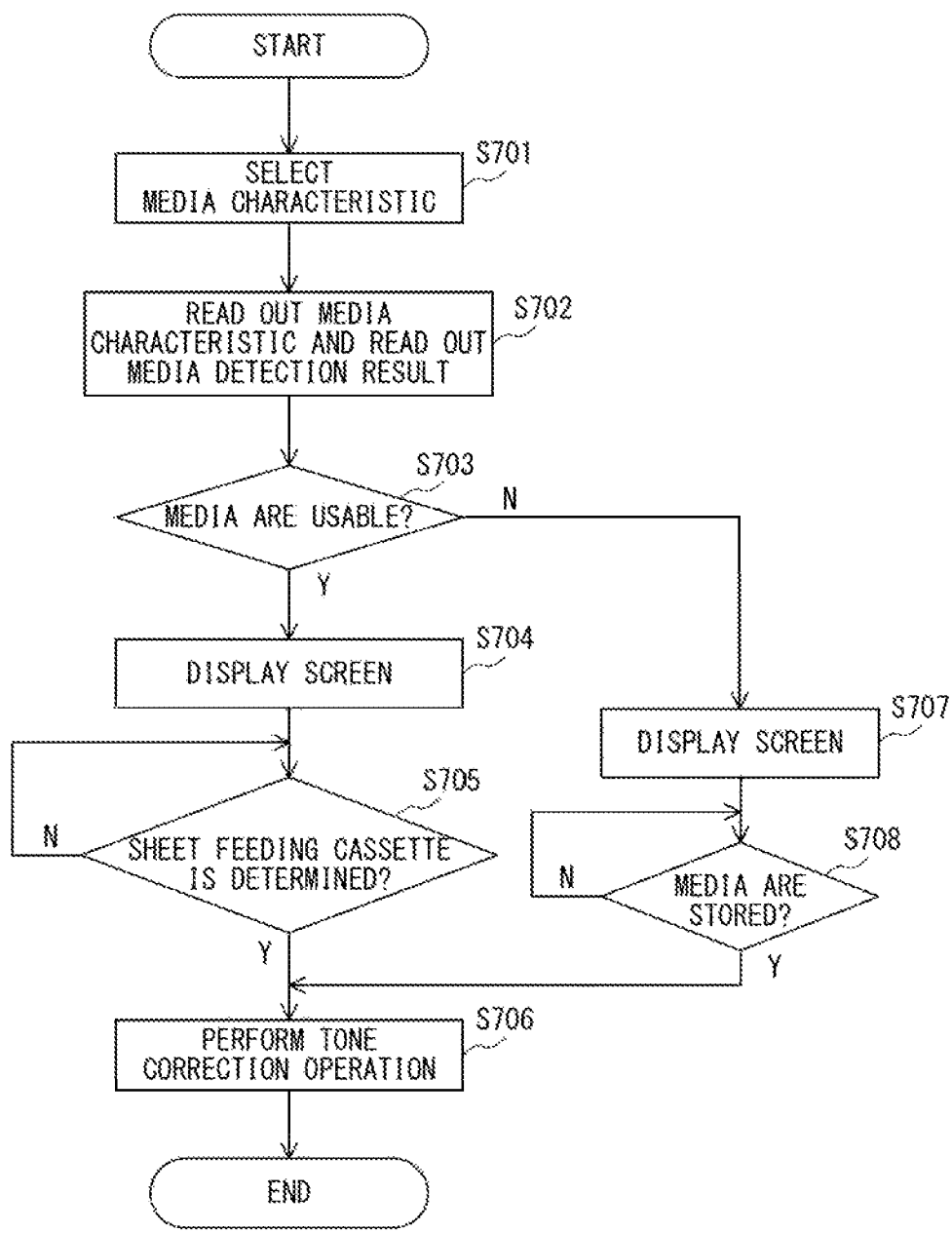
FIG. 21 is a flow chart for illustrating the tone correction processing.

In the fifth embodiment, the print processing accompanied by the tone correction itself is similar to that of the first embodiment, but the tone correction processing of Step S107 (see FIG. 7) is different. FIG. 21 is a flow chart for illustrating the tone correction processing of Step S107 in the fifth embodiment. Similarly to the first embodiment, the tone correction processing is started when the type of media is selected from the media selection screen of FIG. 5A.

The CPU 10 which has started the tone correction selects the media characteristic required for the tone correction in accordance with the type of media selected from the media selection screen (Step S701). The CPU 10 reads out, from the media information, the media detection result and the media characteristic of the media stored in each of the sheet feeding cassettes 220 to 223 (Step S702). The CPU 10 compares the media characteristic selected in the process step of Step S701 with the media characteristic read out in Step S702, and determines the presence or absence of the usable sheet feeding cassette (Step S703).

When the usable sheet feeding cassette is present (Step S703: Y), the CPU 10 displays, as exemplified in FIG. 6, the sheet feeding cassette selection screen in which the selectable sheet feeding cassette and the non-selectable sheet feeding cassette are distinguished from each other (Step S704). The user gives, through the operation unit 13, an instruction on the sheet feeding cassette in which the media to be used in the tone correction are stored from the sheet feeding cassette selection screen. The CPU 10 obtains, from the operation unit 13, the instruction on the sheet feeding cassette in which the media to be used in the tone correction are stored, and determines the sheet feeding cassette to be used (Step S705: Y). The CPU 10 starts the feeding of the medium from the determined sheet feeding cassette so as to execute the tone correction (Step S706). The CPU 10 prints the test image on the medium so as to create the adjustment chart. The color of the adjustment chart is measured by the image reading unit 300. The CPU 10 performs the tone correction based on the color measurement result of the adjustment chart obtained by the image reading unit 300.

When the usable sheet feeding cassette is absent (Step S703: N), the CPU 10 displays the sheet feeding cassette instruction screen as exemplified in FIG. 20 (Step S707). Through the sheet feeding cassette instruction screen, the CPU 10 urges the user to store the media into a predetermined sheet feeding cassette. The user stores the media into the sheet feeding cassette in accordance with the instruction of the sheet feeding cassette instruction screen, and then presses the "OK" button through the operation unit 13. In this manner, the CPU 10 is notified that the media have been stored in the predetermined sheet feeding cassette. The CPU 10 determines that the media have been stored based on this notification (Step S708). The CPU 10 starts the feeding of the medium from the sheet feeding cassette in which the medium has been stored so as to execute the tone correction (Step S706). The CPU 10 prints the test image on the medium so as to create the adjustment chart. The color of the adjustment chart is measured by the image reading unit 300. The CPU 10 performs the tone correction based on the color measurement result of the adjustment chart obtained by the image reading unit 300.

Even when the image forming apparatus 100 has a configuration in which the media are fed not only from the sheet feeding cassette but also from the manual feed tray, the fifth embodiment can be applied thereto so that a similar effect can be obtained. That is, the sheet feeding cassette instruction screen may give an instruction to place the media on the manual feed tray instead of the sheet feeding cassette.

The image forming apparatus 100 according to the fifth embodiment described above causes, when the sheet feeding cassette in which the media usable at the time of the tone correction are stored cannot be selected, the user to store the media usable in the tone correction into a predetermined sheet feeding cassette. Thus, the image forming apparatus 100 can form the test image on an appropriate type of media, and can adjust the image forming condition. Thus, the image forming apparatus 100 can prevent the quality of the printed product from being reduced. Further, even in a configuration in which, other than the tone correction, calibration of printing the test image on the medium is performed and in the fixing cleaning as described in the third embodiment, the fifth embodiment can be applied thereto so that a similar effect can be obtained.

As described above with reference to the first to fifth embodiments, when the image forming apparatus 100 performs predetermined processing to be performed through use of media, such as the fixing cleaning or the adjustment of the image forming condition, for example, the tone correction, the image forming apparatus 100 causes the user to select the sheet feeding cassette in which the usable media are stored. At this time, the image forming apparatus 100 displays the selection screen so that the user can visually easily determine the selectable sheet feeding cassette. The image forming apparatus 100 includes the media sensor 14, and the media characteristic (type of media) usable in the predetermined processing is determined based on the detection result of the media characteristic obtained by the media sensor 14. The predetermined processing refers to processing using the media, such as image forming condition correction processing like the tone correction, or cleaning of the image forming unit 17 (for example, fixing cleaning).

That is, the sheet feeding cassette selectable by the user and the sheet feeding cassette not selectable by the user are determined based on the detection result obtained by the media sensor 14. The selectable sheet feeding cassette stores media having a media characteristic usable in the processing. The non-selectable sheet feeding cassette stores media having a media characteristic unusable in the processing. The user selects the sheet feeding cassette to be used from the selectable sheet feeding cassette. That is, the user can select the sheet feeding cassette in which the media appropriate for the predetermined processing are stored. In this manner, the processing using the media inappropriate for the predetermined processing can be prevented from being executed. Accordingly, correct processing can be executed, and, as a result, the quality of the printed product can be prevented from being reduced.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-068517, filed Apr. 14, 2021, which is hereby incorporated by reference herein in its entirety.

What is claimed is:

1. An image forming apparatus comprising:
a sheet feeding unit configured to store media;
an image forming unit configured to form an image on media;
a media sensor which is provided on a conveyance path through which the media are fed from the sheet feeding unit to the image forming unit, the media sensor being configured to detect a type of the media; and
an input unit configured to select media used for calibration of the image forming unit,
wherein, before the type of the media is detected by the media sensor, the media stored in the sheet feeding unit are not selectable by the input unit, and
wherein, after the type of the media is detected by the media sensor, the media stored in the sheet feeding unit are selectable by the input unit.

2. The image forming apparatus according to claim 1,
wherein the input unit is capable of inputting the type of the media to be used for the calibration, and
wherein, in a case in which the type of the media input by the input unit does not match the type of the media stored in the sheet feeding unit detected by the media sensor, the media stored in the sheet feeding unit is not selectable by the input unit, and
wherein, in a case in which the type of the media input by the input unit matches the type of the media stored in the sheet feeding unit detected by the media sensor, the media stored in the sheet feeding unit are selectable by the input unit.

3. The image forming apparatus according to claim 1,
wherein the input unit comprises a display,
wherein the input unit is configured to be capable of inputting the type of the media to be used for the calibration, and
wherein, in a case in which the type of the media input by the input unit does not match the type of the media stored in the sheet feeding unit detected by the media sensor, a message indicating that the media stored in the sheet feeding unit cannot be used for the calibration is displayed on the display.

4. The image forming apparatus according to claim 1,
wherein the input unit comprises a display, and
wherein the type of the media stored in the sheet feeding unit detected by the media sensor is displayed on the display.

5. The image forming apparatus according to claim 1, wherein a density of the image formed by the image forming unit is adjusted by the calibration.

6. The image forming apparatus according to claim 1, wherein cleaning of the image forming unit is performed by the calibration.

7. The image forming apparatus according to claim 1,
wherein the image forming unit includes a fixing device configured to fix the image on each of the media, and
wherein cleaning of the fixing device is performed by the calibration.

* * * * *